United States Patent
Horn et al.

(10) Patent No.: US 11,799,620 B2
(45) Date of Patent: Oct. 24, 2023

(54) BOOSTED NONCOHERENT MODULATION

(71) Applicant: QUALCOMM Incorporated, San Diego, CA (US)

(72) Inventors: Idan Michael Horn, Hod Hasharon (IL); Amit Bar-Or Tillinger, Tel-Aviv (IL); Michael Levitsky, Rehovot (IL); Eliyahu Arbiv, Nir Galim (IL)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/184,406

(22) Filed: Feb. 24, 2021

(65) Prior Publication Data

US 2021/0336754 A1 Oct. 28, 2021

Related U.S. Application Data

(60) Provisional application No. 63/016,192, filed on Apr. 27, 2020.

(51) Int. Cl.
*H04L 5/00* (2006.01)
*H04W 76/12* (2018.01)
(Continued)

(52) U.S. Cl.
CPC .......... *H04L 5/0098* (2013.01); *H04L 5/0083* (2013.01); *H04L 27/2653* (2013.01);
(Continued)

(58) Field of Classification Search
CPC . H04L 5/0098; H04L 5/0083; H04L 27/2653; H04L 27/2602; H04L 5/0046;
(Continued)

(56) References Cited

U.S. PATENT DOCUMENTS

2015/0358193 A1* 12/2015 Lorca Hernando .......................... H04L 27/26526
370/329
2015/0373649 A1  12/2015 Tabet et al.
(Continued)

FOREIGN PATENT DOCUMENTS

| EP | 2037609 A1 | 3/2009 |
| WO | WO-2018134838 A1 | 7/2018 |

OTHER PUBLICATIONS

International Search Report and Written Opinion—PCT/US2021/019684—ISA/EPO—Jun. 8, 2021.

*Primary Examiner* — Yu-Wen Chang
(74) *Attorney, Agent, or Firm* — Sevan Savsa; Holland & Hart LLP

(57) ABSTRACT

Methods, systems, and devices for wireless communications are described. A transmitting device may encode a set of data bits on a set of subcarriers based on a boosting factor, and map the set of encoded data bits to a resource block including a first subset of subcarriers corresponding to the set of encoded data bits and a second subset of subcarriers corresponding to a set of null bits. The transmitting device may generate and transmit a signal including the set of encoded data bits. A receiving device may receive a modulated signal on a set of subcarriers, and de-map the modulated signal to a first subset of subcarriers and a second subset of subcarriers based on a boosting factor. The receiving device may decode the first subset of subcarriers to a first set of data bits and the second subset of subcarriers to a second set of data bits.

29 Claims, 16 Drawing Sheets

(51) Int. Cl.
*H04L 27/26* (2006.01)
*H04W 72/0453* (2023.01)
*H04W 72/23* (2023.01)

(52) U.S. Cl.
CPC ....... *H04W 72/0453* (2013.01); *H04W 72/23* (2023.01); *H04W 76/12* (2018.02)

(58) Field of Classification Search
CPC .......... H04L 27/26025; H04L 5/0007; H04W 72/0453; H04W 72/1289; H04W 76/12
See application file for complete search history.

(56) References Cited

U.S. PATENT DOCUMENTS

| | | | | |
|---|---|---|---|---|
| 2016/0013952 | A1* | 1/2016 | Nakamura | H04L 27/2647 375/340 |
| 2016/0373237 | A1* | 12/2016 | Shellhammer | H04L 5/0007 |
| 2017/0034817 | A1* | 2/2017 | Park | H04L 5/0082 |
| 2018/0054343 | A1* | 2/2018 | Suzuki | H04J 11/00 |
| 2018/0092080 | A1* | 3/2018 | Kim | H04L 5/0053 |
| 2018/0213599 | A1* | 7/2018 | Kazmi | H04W 24/10 |
| 2019/0288811 | A1* | 9/2019 | Chang | H04L 1/0041 |
| 2019/0289549 | A1* | 9/2019 | Lim | H04W 52/0219 |
| 2020/0127877 | A1* | 4/2020 | Aio | H04W 72/04 |
| 2020/0244503 | A1* | 7/2020 | Bala | H04L 27/2613 |
| 2020/0245281 | A1* | 7/2020 | Chae | H04W 72/048 |
| 2020/0336249 | A1* | 10/2020 | Yl | H04W 72/1263 |
| 2021/0344542 | A1* | 11/2021 | Mazloum | H04W 52/0229 |
| 2021/0377942 | A1* | 12/2021 | Lopez | H04B 7/0413 |

* cited by examiner

Resource Block

| | | | | | | | | | | | | |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| . | . | | | | | | | | | | | |
| . | . | | | | | | | | | | | |
| . | . | | | | | | | | | | | |
| $S_{10} * S_{20} * S_{30}$ | $S_{11} * S_{21} * S_{31}$ | . | . | . | | | | | | | | |
| $S_{10} * S_{20}$ | $S_{11} * S_{21}$ | . | . | . | | | | | | | | |
| $S_{10}$ | $S_{11}$ | . | . | . | | | | | | | | |
| 1 | 1 | 1 | 1 | 1 | 1 | 1 | 1 | 1 | 1 | 1 | 1 | 1 |

320 — row with $S_{10} * S_{20} * S_{30}$
315 — row with $S_{10} * S_{20}$
310 — row with $S_{10}$
305 — row with 1

FIG. 3A 300-a

Resource Block

| | | | | | | | | | | | | |
|---|---|---|---|---|---|---|---|---|---|---|---|---|
| | | | | | | | | | | | | |
| | | | | | | | | | | | | |
| | | | | | | | | | | | | |
| . | . | | | | | | | | | | | |
| . | . | | | | | | | | | | | |
| $S_{10} * S_{20} * S_{30}$ | $S_{11} * S_{21} * S_{31}$ | | | | | | | | | | | |
| $S_{10} * S_{20} * S_{30}$ | $S_{11} * S_{21} * S_{31}$ | | | | | | | | | | | |
| $S_{10} * S_{20}$ | $S_{10} * S_{20}$ | | | | | | | | | | | |
| $S_{10} * S_{20}$ | $S_{10} * S_{20}$ | | | | | | | | | | | |
| $S_{10}$ | $S_{11}$ | . | . | . | | | | | | | | |
| $S_{10}$ | $S_{11}$ | . | . | . | | | | | | | | |
| 1 | 1 | . | . | . | | | | | | | | |
| 1 | 1 | 1 | 1 | 1 | 1 | 1 | 1 | 1 | 1 | 1 | 1 | 1 |

340 — two rows with $S_{10} * S_{20} * S_{30}$
335 — two rows with $S_{10} * S_{20}$
330 — two rows with $S_{10}$
325 — two rows with 1

FIG. 3B 300-b

| Configuration 405 | Configuration 410 | Configuration 415 |
|---|---|---|
| $s_{10} * s_{20} * s_{30}$ | 0 | $\sqrt{2} * s_{10} * s_{20} * s_{30}$ |
| $s_{10} * s_{20} * s_{30}$ | 0 | 0 |
| $s_{10} * s_{20}$ | 0 | $\sqrt{2} * s_{10} * s_{20}$ |
| $s_{10} * s_{20}$ | 0 | 0 |
| $s_{10}$ | $\sqrt{2} * s_{10} * s_{20} * s_{30}$ | $\sqrt{2} * s_{10}$ |
| $s_{10}$ | $\sqrt{2} * s_{10} * s_{20}$ | 0 |
| 1 | $\sqrt{2} * s_{10}$ | $\sqrt{2} * 1$ |
| 1 | $\sqrt{2} * 1$ | 0 |

— 400

BOOSTED NONCOHERENT MODULATION

CROSS REFERENCE

The present application for patent claims the benefit of U.S. Provisional Patent Application No. 63/016,192 by HORN et al., entitled "BOOSTED NONCOHERENT MODULATION," filed Apr. 27, 2020, assigned to the assignee hereof, and expressly incorporated by reference herein.

FIELD OF TECHNOLOGY

The following relates generally to wireless communications and more specifically to boosted noncoherent modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device to provide boosted noncoherent modulation. By boosting noncoherent modulation, the communication device may reduce one or more impacts of amplified noise related to various modulation schemes, such as differential phase shift keying (DPSK) modulation. The communication device may be configured to apply a boosting factor (e.g., $\sqrt{R}$) to a signal during mapping of the signal to time and frequency resources to increase a signal to noise ratio (SNR) of the signal, where R may be a repetition value for mapping the signal. For example, the communication device may be configured to employ a resource element mapper to apply the boosting factor (e.g., $\sqrt{R}$) to subcarriers of the mapped signal to boost the signal. The communication device may be configured to map the subcarriers to a resource block using various mapping configurations as described herein.

The communication device may map information bits (e.g., control bits, data bits) to a set of adjacent subcarriers in the resource block, or the communication device may map the information such that the communication is spaced (e.g., equally spaced) in the resource block. In some examples, the communication device may include null bits (e.g., a set of silent subcarriers) mapped in the resource block to preserve a total energy of a signal based on the mapping. Additionally or alternatively, the communication device may be configured to receive a boosted signal, de-map the signal to a multiple sets of subcarriers, and decode the sets to information bits (e.g., data bits) or to the null bits. The described techniques may, as a result, include features for improvements to wireless communications and, in some examples, may promote enhanced efficiency for high reliability and low latency wireless communications in 5G systems, among other benefits.

A method for wireless communications at a transmitting device. The method may include encoding a set of data bits to transmit to a receiving device on a set of subcarriers based at least in part on a boosting factor, mapping the set of encoded data bits to a resource block comprising a first subset of subcarriers corresponding to the set of encoded data bits and a second subset of subcarriers corresponding to a set of null bits, generating a signal comprising the set of encoded data bits based at least in part on the mapping, and transmitting the generated signal to the receiving device.

An apparatus for wireless communications is described. The apparatus may include a processor, memory coupled with the processor, and instructions stored in the memory. The instructions may be executable by the processor to cause the apparatus to encode a set of data bits to transmit to a receiving device on a set of subcarriers based at least in part on a boosting factor, map the set of encoded data bits to a resource block comprising a first subset of subcarriers corresponding to the set of encoded data bits and a second subset of subcarriers corresponding to a set of null bits, generate a signal comprising the set of encoded data bits based at least in part on the mapping, and transmit the generated signal to the receiving device.

Another apparatus for wireless communications is described. The apparatus may include means for encoding a set of data bits to transmit to a receiving device on a set of subcarriers based at least in part on a boosting factor, means for mapping the set of encoded data bits to a resource block comprising a first subset of subcarriers corresponding to the set of encoded data bits and a second subset of subcarriers corresponding to a set of null bits, means for generating a signal comprising the set of encoded data bits based at least in part on the mapping, and means for transmitting the generated signal to the receiving device.

A non-transitory computer-readable medium storing code for wireless communications at a transmitting device is described. The code may include instructions executable by a processor to encode a set of data bits to transmit to a receiving device on a set of subcarriers based at least in part on a boosting factor, map the set of encoded data bits to a resource block comprising a first subset of subcarriers corresponding to the set of encoded data bits and a second subset of subcarriers corresponding to a set of null bits, generate a signal comprising the set of encoded data bits based at least in part on the mapping, and transmit the generated signal to the receiving device.

Some examples of the method, apparatuses, and non-transitory computer-readable medium described herein may further include operations, features, means, or instructions for identifying a first symbol period in the resource block adjacent to a second symbol period in the resource block based at least in part on the mapping, and allocating the first subset of subcarriers to the first symbol period and the second subset of subcarriers to the second symbol period, where mapping the set of encoded data bits to the resource block is based at least in part on the allocating.

Some examples of the method, apparatuses, and non-transitory computer-readable medium described herein may further include operations, features, means, or instructions for identifying a first spacing for a first set of symbol periods in the resource block and a second spacing for a second set of symbol periods in the resource block, wherein the first spacing for the first set of symbol periods is equal to the second spacing for the second set of symbol periods, and allocating the first subset of subcarriers to the first set of symbol periods and the second subset of subcarriers to the second set of symbol periods, where mapping the set of encoded data bits to the resource block is based at least in part on the allocating.

In some examples of the method, apparatuses, and non-transitory computer-readable medium described herein, the first set of symbol periods is interleaved with the second set of symbol periods.

Some examples of the method, apparatuses, and non-transitory computer-readable medium described herein may further include operations, features, means, or instructions for determining a frequency shift between the first subset of subcarriers and the second subset of subcarriers based at least in part on the mapping, where generating the signal comprising the set of encoded data bits is based at least in part on the frequency shift between the first subset of subcarriers and the second subset of subcarriers.

Some examples of the method, apparatuses, and non-transitory computer-readable medium described herein may further include operations, features, means, or instructions for scaling the second subset of subcarriers based at least in part on the boosting factor and a total energy of the generated signal, where transmitting the generated signal to the receiving device is based at least in part on scaling the second subset of subcarriers.

Some examples of the method, apparatuses, and non-transitory computer-readable medium described herein may further include operations, features, means, or instructions for performing a noise coherence estimation for the generated signal using the second subset of subcarriers based at least in part on the scaling.

Some examples of the method, apparatuses, and non-transitory computer-readable medium described herein may further include operations, features, means, or instructions for rate matching the set of encoded data bits based at least in part on the boosting factor.

In some examples of the method, apparatuses, and non-transitory computer-readable medium described herein, the boosting factor is a square root of a repetition factor.

In some examples of the method, apparatuses, and non-transitory computer-readable medium described herein, the generated signal comprises a same total energy equal to a second signal generated without the boosting factor.

In some examples of the method, apparatuses, and non-transitory computer-readable medium described herein, a value of the boosting factor is based at least in part on a modulation and coding scheme (MCS) value, a constellation mapping configuration, a frequency allocation parameter, a channel condition, a configuration of the transmitting device, or a configuration of the receiving device, or any combination thereof.

Some examples of the method, apparatuses, and non-transitory computer-readable medium described herein may further include operations, features, means, or instructions for transmitting a downlink control information (DCI) message comprising an indication of the boosting factor.

Some examples of the method, apparatuses, and non-transitory computer-readable medium described herein may further include operations, features, means, or instructions for identifying the boosting factor in a lookup table, wherein encoding the set of data bits to transmit to the receiving device is based at least in part on identifying the boosting factor in the lookup table.

In some examples of the method, apparatuses, and non-transitory computer-readable medium described herein, the mapping comprises a non-coherent modulation mapping.

Some examples of the method, apparatuses, and non-transitory computer-readable medium described herein may further include operations, features, means, or instructions for transmitting a radio resource control (RRC) connection establishment message comprising a set of parameters indicating the boosting factor per MCS.

A method of wireless communications at a receiving device is described. The method may include receiving a modulated signal from a transmitting device on a set of subcarriers, de-mapping the modulated signal to a first subset of subcarriers and a second subset of subcarriers based at least in part on a boosting factor, and decoding the first subset of subcarriers to a first set of data bits and the second subset of subcarriers to a second set of data bits.

An apparatus for wireless communications is described. The apparatus may include a processor, memory coupled with the processor, and instructions stored in the memory. The instructions may be executable by the processor to cause the apparatus to receive a modulated signal from a transmitting device on a set of subcarriers, de-map the modulated signal to a first subset of subcarriers and a second subset of subcarriers based at least in part on a boosting factor, and decode the first subset of subcarriers to a first set of data bits and the second subset of subcarriers to a second set of data bits.

Another apparatus for wireless communications is described. The apparatus may include means for receiving a modulated signal from a transmitting device on a set of subcarriers, means for de-mapping the modulated signal to a first subset of subcarriers and a second subset of subcarriers based at least in part on a boosting factor, and means for decoding the first subset of subcarriers to a first set of data bits and the second subset of subcarriers to a second set of data bits.

A non-transitory computer-readable medium storing code for wireless communications at a receiving device is described. The code may include instructions executable by a processor to receive a modulated signal from a transmitting device on a set of subcarriers, de-map the modulated signal to a first subset of subcarriers and a second subset of subcarriers based at least in part on a boosting factor, and decode the first subset of subcarriers to a first set of data bits and the second subset of subcarriers to a second set of data bits.

Some examples of the method, apparatuses, and non-transitory computer-readable medium described herein may further include operations, features, means, or instructions for identifying the boosting factor associated with the modulated signal, and scaling a decoding rate of the first subset of subcarriers and the second subset of subcarriers based at least in part on the boosting factor, where decoding the first subset of subcarriers and the second subset of subcarriers is based at least in part on the scaled decoding rate.

Some examples of the method, apparatuses, and non-transitory computer-readable medium described herein may further include operations, features, means, or instructions for demodulating the first subset of subcarriers and the second subset of subcarriers based at least in part on the boosting factor.

Some examples of the method, apparatuses, and non-transitory computer-readable medium described herein may further include operations, features, means, or instructions for performing an error check procedure on the first set of data bits, and decoding the first set of data bits based at least in part on the first set of data bits passing the error check procedure.

In some examples of the method, apparatuses, and non-transitory computer-readable medium described herein, the error check procedure comprises a cyclic redundancy check procedure.

Some examples of the method, apparatuses, and non-transitory computer-readable medium described herein may further include operations, features, means, or instructions for determining that the second subset of subcarriers comprises a set of silent subcarriers, and assigning the set of silent subcarriers for noise coherence estimation.

In some examples of the method, apparatuses, and non-transitory computer-readable medium described herein, a total energy of the modulated signal is based at least in part on the boosting factor.

Some examples of the method, apparatuses, and non-transitory computer-readable medium described herein may further include operations, features, means, or instructions for receiving a DCI message comprising an indication of the boosting factor, wherein de-mapping the modulated signal to the first subset of subcarriers and the second subset of subcarriers is based at least in part on receiving the DCI message comprising the indication of the boosting factor.

Some examples of the method, apparatuses, and non-transitory computer-readable medium described herein may further include operations, features, means, or instructions for identifying the boosting factor in a lookup table, wherein de-mapping the modulated signal to the first subset of subcarriers and the second subset of subcarriers is based at least in part on identifying the boosting factor in the lookup table.

Some examples of the method, apparatuses, and non-transitory computer-readable medium described herein may further include operations, features, means, or instructions for receiving an RRC connection establishment message comprising a set of parameters indicating the boosting factor per MCS.

BRIEF DESCRIPTION OF THE DRAWINGS

FIGS. 3A and 3B illustrate examples of resource block configurations that support boosted noncoherent modulation in accordance with aspects of the present disclosure.

DETAILED DESCRIPTION

Figure 1:
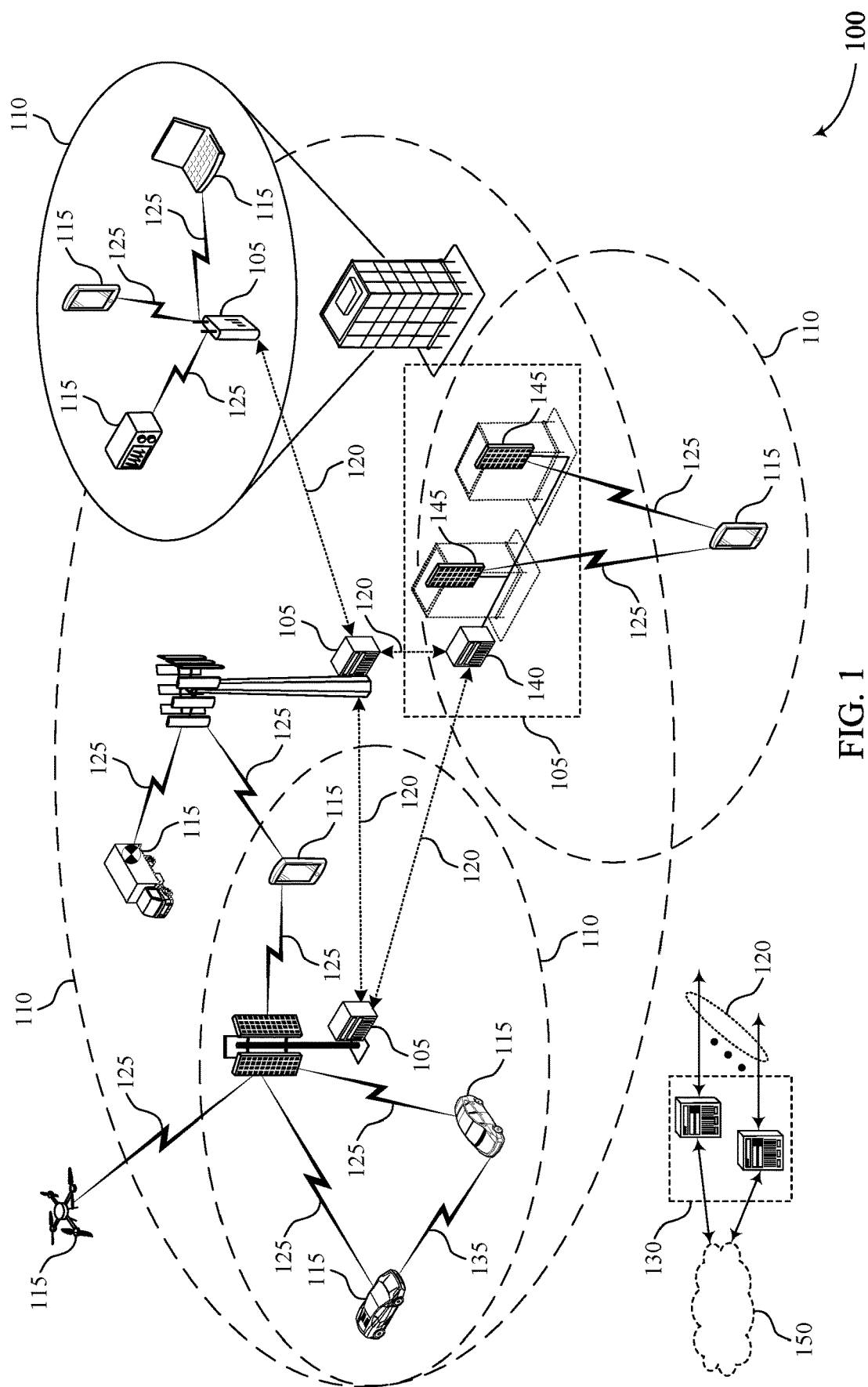
FIGS. 1 and 2 illustrate examples of wireless communications systems for wireless communications that support boosted noncoherent modulation in accordance with aspects of the present disclosure.

Some wireless communications systems may include communication devices, such as user equipment (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may support various modulation schemes, such as noncoherent differential phase shift keying (DPSK) modulation, which may be used to increase efficiency and signaling performance. For example, noncoherent DPSK modulation may be used for high reliability and low latency wireless communications, such as in ultra-reliable low latency communications (URLLC).

As part of DPSK modulation, the communication devices may be configured for each subcarrier of a signal to combine data (e.g., data bits, data samples) of a temporally adjacent subcarrier. For example, the communication devices may be configured for each subcarrier to multiply data (e.g., data bits, data samples) of one or more subcarriers, such as a temporally adjacent subcarrier. Multiplying the data of the temporally adjacent subcarrier for each subcarrier may, however, cause adverse impacts on the signal. For instance, multiplying adjacent subcarriers during modulation may also multiply or amplify noise associated with the adjacent subcarriers (e.g., resulting in squared noise). In some cases, with low signal to noise ratios (SNR), the multiplied noise may degrade signaling performance by the communication devices. To reduce the effects of the amplified noise, the communication devices may be configured to increase an SNR and a gain of a signal to boost the signal.

The communication devices may be configured, for example, to boost a signal associated with one or more subcarriers in a resource block by applying a boosting factor at various portions of a mapping process. The boosting factor may be associated with a repetition rate R (e.g., $\sqrt{R}$). In some examples, the boosted signal may be distributed across a number of boosted subcarriers, or the signal may be mapped to a single boosted subcarrier, each boosting scheme corresponding to a number of silent subcarriers which may maintain a total energy of an original signal (e.g., a non-boosted signal). The communication device may, via a resource element mapper, apply a boosting factor of $\sqrt{R}$ to boost the signal. The resource element mapper may apply the boosting factor to one or more subcarriers of the resource block according to different mapping configurations.

According to a first mapping configuration, the communication device may map information bits (e.g., data bits) to adjacent data symbols in the resource block, which may include mapping a set of adjacent data subcarriers in a first portion of the resource block, (e.g., the subcarriers boosted according to the boosting factor), and mapping an additional set of adjacent subcarriers (e.g., the silent subcarriers) to a second portion of the resource block. Alternatively, according to a second mapping configuration, the communication device may map information bits (e.g., data bits) to subcarriers in the resource block such that the information bits (e.g., data bits) are equally spaced in the resource block. In some examples, the mapping may include alternating or interleaving data subcarriers and silent subcarriers on resource block such that the spacing between the data subcarriers is equal.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to wireless communications. In some examples, configuring the communication devices to provide boosted noncoherent modulation may support improvements to power consumption, spectral efficiency, and, in some examples, may promote enhanced efficiency for wireless communications operations, among other benefits.

Aspects of the disclosure are initially described in the context of wireless communications systems. For example, aspects of the disclosure are described with respect to communications between transmitting and receiving devices of the wireless communications system. Aspects of the disclosure are further illustrated by and described with reference to apparatus diagrams, system diagrams, and flowcharts including process flow diagrams from a transmitting device perspective that relate to boosted noncoherent modulation.

FIG. 1 illustrates an example of a wireless communications system 100 that supports boosted noncoherent modulation in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support increasing an SNR for signal boosting or repetition of the transmitted signal. For example, a base station 105 or a UE 115, or both, may apply a boosting factor (e.g., $\sqrt{R}$) to a signal during mapping, where R is a repetition value for mapping the signal. The base station 105 or the UE 115, or both, may use a number of silent subcarriers to maintain a total transmitted energy of the signal. The silent subcarriers (e.g., empty subcarriers) may be used for estimating a noise of the signal. The base station 105 or the UE 115, or both, may employ a resource element mapper to apply the boosting factor of $\sqrt{R}$ to one or more subcarriers of the mapped signal to boost the signal.

According to a first mapping configuration, the base station 105 or the UE 115, or both, may map information bits (e.g., data bits) to adjacent data symbols of the resource block in a time domain, which may include mapping a set of adjacent data subcarriers in a first portion of the resource block, (e.g., the subcarriers boosted according to the boosting factor), and mapping an additional set of adjacent subcarriers (e.g., the silent subcarriers) to a second portion of the resource block. According to a second mapping configuration, the base station 105 or the UE 115, or both, may map information bits (e.g., data bits) to subcarriers of the resource block such that the information bits (e.g., data bits) are equally spaced in the resource block. The mapping may, additionally or alternatively, include alternating or interleaving data subcarriers and silent subcarriers on resource block such that the spacing between the data subcarriers is equal. The wireless communications system 100 may, as a result, include features for improvements to wireless communications between the base stations 105 and the UEs 115 and, in some examples, may promote enhanced efficiency for high reliability and low latency wireless communications in 5G systems, among other benefits.

Figure 2:
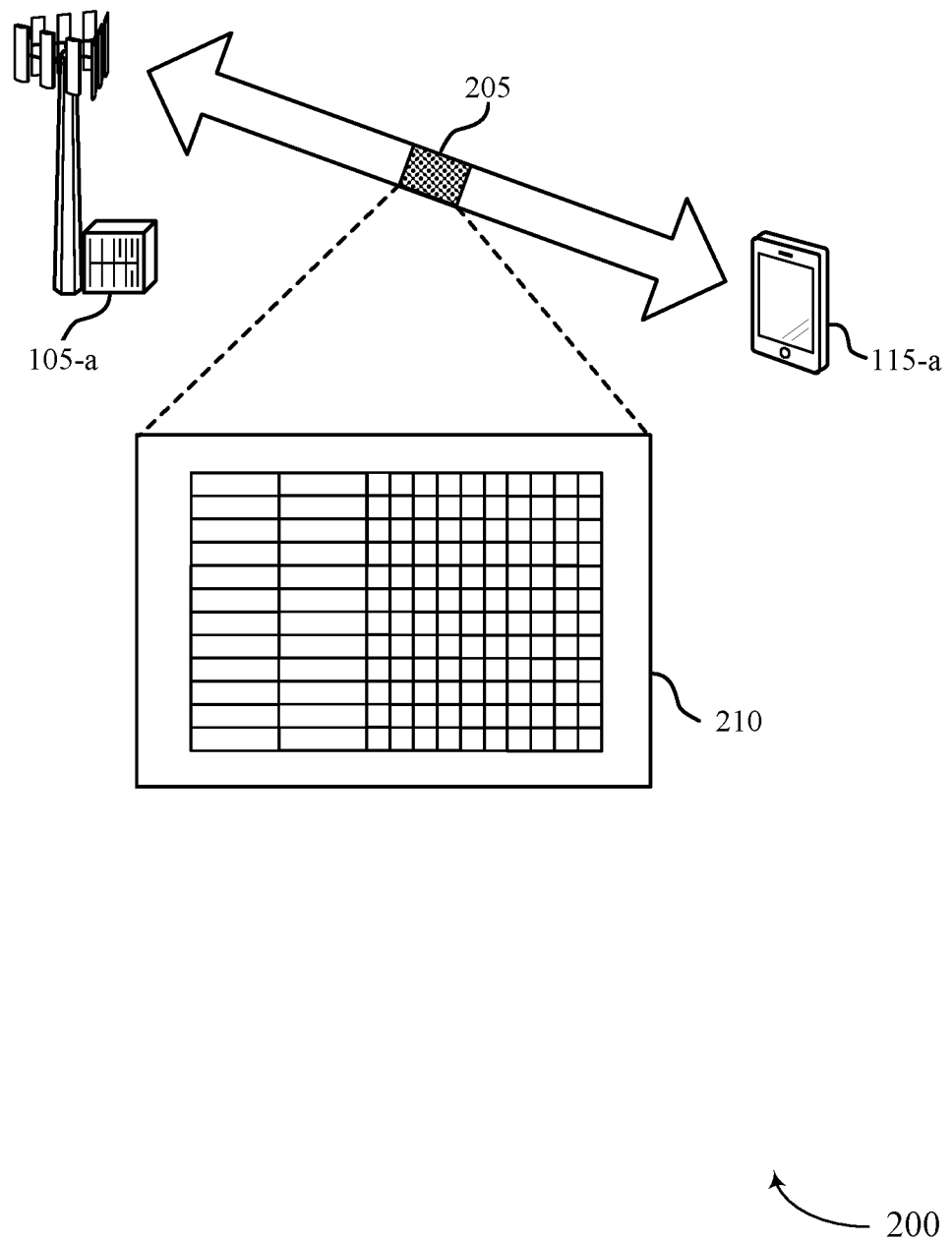

FIG. 2 illustrates an example of a wireless communications system 200 that supports boosted noncoherent modulation in accordance with aspects of the present disclosure. The wireless communications system 200 may implement or be implemented by aspects of the wireless communications system 100 or may implement aspects of the wireless communications systems 100. For example, the wireless communications system 200 may include a base station 105-*a* and a UE 115-*a*, which may be examples of a base station 105 and a UE 115 described herein. The wireless communications system 200 may support multiple radio access technologies including 4G systems such as LTE systems, LTE-A systems, or LTE-A Pro systems, and 5G systems, which may be referred to as NR systems.

The wireless communications system 200 may support various modulation and demodulation schemes, such as noncoherent DPSK modulation. The base station 105-*a* or the UE 115-*a*, or both, may use noncoherent DPSK modulation to improve efficiency in the wireless communications system 200. For example, noncoherent DPSK modulation may provide higher reliability and lower latency in physical downlink control channel (PDCCH) URLLC between the base station 105-*a* and the UE 115-*a*. In noncoherent DPSK modulation, the base station 105-*a* or the UE 115-*a*, or both, may bypass coherent channel estimation and channel equalization.

In the example of FIG. 2, the base station 105-*a* may be referred to as a transmitting device, while the UE 115-*a* may be referred to as a receiving device. Additionally or alternatively, the base station 105-*a* may be referred to as a receiving device, while the UE 115-*a* may be referred to as a transmitting device. The base station 105-*a* may select one or more subcarriers for a signal 205 carrying information (e.g., control, data) to transmit to the UE 115-*a*. As part of DPSK modulation, the base station 105-*a* may combine information (e.g., data) of one or more subcarriers that are adjacent in a time domain to the one or more selected subcarriers for the signal 205. For example, in noncoherent DPSK modulation, the signal 205 may be used as a reference, eliminating use of an additional reference signal, which may reduce computational complexity and power consumption for the base station 105-*a* or the UE 115-*a*, or both.

The base station 105-*a* may increase a reliability of the DPSK modulation by using a symbol repetition for the signal 205. An output of a modulator of the base station 105-*a*, based in part on the symbol repetition, may be given by Equation (1):

$$x_{R \cdot k} = x_{R \cdot k-1} s_k, \quad k \geq 0 \qquad (1)$$
$$x_{R \cdot k+1} = x_{R \cdot k+i-1} \quad R > i \geq 1, k \geq 0$$
$$x_{-1} = 1$$

where $s_k$ represents a data symbol and $x_{R \cdot k}$ represents a modulated signal associated with a given repetition factor R, which may be a factor that scales a rate for rate matching the information bits (e.g., data bits) of the signal 205. The data symbol $s_k$ may be multiplied by an adjacent subcarrier $X_{R \cdot k-1}$ (e.g., a temporally adjacent subcarrier) as part of the DPSK modulation. Multiplying the adjacent subcarriers during modulation may also multiply (or amplify) a noise associated with the adjacent subcarriers, and thereby influencing processing of the signal 205.

To reduce unfavorable effects of the amplified noise, the base station 105-*a* may be configured to increase an SNR of the signal 205, for example, by boosting the signal 205 or repetition of the signal 205. The base station 105-*a* may boost the signal 205 by applying a boosting factor to various portions a mapping process for the signal 205. In some examples, the boosting factor may be associated with the repetition rate R (e.g., √W). To increase an SNR of the signal 205 by boosting, the base station 105-*a* may use a number of silent subcarriers (e.g., empty subcarriers) along with the boosted subcarriers in a resource block 210, to maintain a total transmitted energy of the signal 205. In some examples, the boosted signal 205 may be distributed across a number of boosted subcarriers, or the signal 205 may be mapped to a single boosted subcarrier, each boosting scheme corresponding to a number of silent subcarriers which maintain the total energy of the original signal (e.g., the non-boosted signal). To transmit on the silent subcarriers, a coding rate may be scaled by a factor of R. For example, fewer subcarriers carrying data may increase the rate. In addition, the silent subcarriers may be used for estimating noise (e.g., recurrent neural network (Rnn) estimation).

The base station 105-*a* may, via a resource element mapper, generate a boosted signal by applying a boosting factor of √R to boost the signal 205. The resource element mapper may apply the boosting factor to one or more subcarriers in the resource block 210 according to different mapping configurations. For example, according to a first mapping configuration, the base station 105-*a* may map information (e.g., data) to adjacent data symbols on a transport block, which may include mapping a set of adjacent data subcarriers in a first portion of the resource block 210, (e.g., the subcarriers boosted according to the boosting factor), and mapping an additional set of adjacent subcarriers (e.g., the silent subcarriers) to a second portion of the resource block 210. In some examples, the base station 105-*a* may implement the first mapping configuration for large delay spread channels, large time offset, etc.

According to a second mapping configuration, the base station 105-*a* may map data to subcarriers of the resource block 210, such that the information (e.g., data) is equally spaced on the resource block 210. In such cases, the base station 105-*a* may map data on a first set of subcarriers to a first set of locations (e.g., resource elements) on the resource block 210, and may map a second set of subcarriers (e.g., silent or empty subcarriers) to a second set of locations (e.g., resource elements) on the resource block 210. In some examples, the mapping may include alternating or interleaving data subcarriers and silent subcarriers on the resource block 210, such that the spacing between the data subcarriers is equal. In some cases, such equal spacing between data may increase channel diversity, and the base station 105-a may dynamically configure the subcarrier spacing. In some examples, the base station 105-a may also configure a frequency shift between the first and second set of subcarriers based on the mapping.

The base station 105-a may generate the signal 205 (e.g., an orthogonal frequency division multiplexed (OFDM) signal) to transmit to the UE 115-a based on the mapping of the boosted subcarriers, where the OFDM signal is boosted according to the boosted subcarriers. The boosting factor R may be configured according to a number of different aspects of the wireless communications system 200, and may be an integer value (e.g., in cases where a corresponding coding rate is smaller than 1). In some examples, the boosting factor may be configured according to a modulation and coding scheme (MCS) value (e.g., where each MCS may have associated repetition factors). In some other cases, the boosting factor may be configured according to a constellation used for mapping the data bits (e.g., BPK, QPSK, DPSK, etc.), or for a given frequency allocation of the signal 205. In addition, the boosting factor may be configured according to certain channel conditions (e.g., delay spread, Doppler spread, time offset, etc.) or other factors. In some examples, the boosting factor information can be conveyed in control information such as in downlink control information (DCI), or the boosting factor may be predefined or selected according to various aspects in a lookup table.

The base station 105-a may also be configured to convey boosting factor information to the UE 115-a in a control message, such as in a DCI message. Alternatively or additionally, the UE 115-a may be configured with a lookup table, which the UE 115-a may use to identify a boosting factor. In some examples, the base station 105-a may be configured to transmit an RRC connection establishment message including a set of parameters indicating the boosting factor per MCS. The UE 115-a may receive the RRC connection establishment message including the set of parameters indicating the boosting factor per MCS. This may reduce the DCI overhead in the price of less flexibility. That is, in some cases, the default configuration desired boosting may be changed during time according to a delay spread or a Doppler spread. As such, the base station 105-a may transmit, and the UE 115-a may receive, the DCI including the boosting factor. In some cases where the channel doesn't change rapidly the base station 105-a may transmit a vector of boosting factors per MCS which can be changed by RRC or MCA-CE messages.

The UE 115-a may receive the boosted signal 205, including the mapped data. The UE 115-a may demodulate the symbols according to the mapping configuration and the boosting factor, and may estimate the data bits based on the demodulated signal. In some cases, the UE 115-a may identify a number of silent subcarriers transmitted in accordance with the mapping and may assign the silent subcarriers for noise coherence (e.g., Rnn) estimation. The UE 115-a may also implement various error checking schemes such as a cyclic redundancy check (CRC) process, or may utilize iterative decoding to increase the reliability of the received data.

The base station 105-a and the UE 115-a may, as a result, include features for improvements to wireless communications between the base station 105-a and the UE 115-a and, in some examples, may promote enhanced efficiency for high reliability and low latency wireless communications in 5G systems, among other benefits. Although aspects of transmitting the signal 205 were described from the perspective of the base station 105-a, the UE 115-a may be configured to perform same or similar operations (or configured with same or similar components) for transmitting the signal 205. Likewise, although aspects of receiving the signal 205 were described from the perspective of the UE 115-a, the base station 105-a may be configured to perform same or similar operations (or configured with same or similar components) for receiving the signal 205.

FIG. 3A illustrates an example of a resource block configuration 300-a that supports boosted noncoherent modulation in accordance with aspects of the present disclosure. The resource block configuration 300-a may implement or be implemented by aspects of the wireless communications systems 100 and 200 or may implement aspects of the wireless communications systems 100 and 200 as described with reference to FIGS. 1 and 2, respectively. For example, the resource block configuration 300-a may be based on a configuration provided by a base station 105 and implemented by the base station 105 or a UE 115, or both. The base station 105 or the UE 115, or both, may support wireless communications using the resource block configuration 300-a. For example, the base station 105 or the UE 115, or both, map information (e.g., control, data) for wireless communications according to the resource block configuration 300-a.

In the example of FIG. 3A, the resource block configuration 300-a may correspond to a noncoherent resource block including a number of resource elements. The base station 105 or the UE 115, or both, may map one or more subcarriers to the resource elements in the resource block. A first row 305 may include known data (e.g., 1). A second row 310 may include subcarriers $s_{10}$ and $s_{11}$ according to a mapping configuration. The third row 315 may include mapped data subcarriers, where adjacent subcarriers are multiplied according to the mapping configuration (e.g., $s_{10}*s_{11}$ and $s_{11}*s_{21}$). A fourth row 320 may include additional mapped data subcarriers, where adjacent subcarriers are multiplied according to the mapping configuration (e.g., $s_{10}*s_{20}*s_{30}$ and $s_{11}*s_{21}*s_{31}$). Adjacent subcarriers may thereby use a same channel, and may be demodulated based on amplitude. The base station 105 or the UE 115, or both, may thus be configured to use adjacent subcarriers in the resource block for wireless communications of signals, and the adjacent subcarriers may use a same communication channel for boosting noncoherent modulation.

FIG. 3B illustrates an example resource block configuration 300-b that supports boosted index modulation for noncoherent modulation in accordance with aspects of the present disclosure. The resource block configuration 300-b may implement or be implemented by aspects of the wireless communications systems 100 and 200 or may implement aspects of the wireless communications systems 100 and 200 as described with reference to FIGS. 1 and 2, respectively. For example, the resource block configuration 300-b may be based on a configuration provided by a base station 105 and implemented by the base station 105 or a UE 115, or both. The base station 105 or the UE 115, or both, may support wireless communications using the resource block configuration 300-b. For example, the base station 105 or the UE 115, or both, map information (e.g., control, data) for wireless communications according to the resource block configuration 300-*b*.

In the example of FIG. 3B, the base station 105 or the UE 115, or both, may map information bits (e.g., data bits) to resource elements in a resource block, and each operation may be repeated according to a repetition rate. For example, in FIG. 3B, the base station 105 or the UE 115, or both, may map information bits (e.g., data bits) to the resource block according to a repetition factor of R=2, where each row of mapped subcarriers is repeated twice. For example, a first row may include known data (e.g., 1) and may be repeated for repetition 325. A second row may include a first mapped subcarrier and a second mapped subcarrier ($s_{10}$ and $s_{11}$) and may be repeated for repetition 330. A third row may include two multiplied adjacent subcarriers and may be repeated for repetition 335 ($s_{10}*s_{20}$). Repetition 340 may include further multiplication of adjacent subcarriers ($s_{10}*s_{20}*s_{30}$). In some examples, the repetition factor R may include a different number of repetitions of the mapped subcarriers. Adjacent subcarriers may thereby use a same channel, and may be demodulated based on amplitude. The base station 105 or the UE 115, or both, may thus be configured to use adjacent subcarriers in the resource block for wireless communications of signals, and the adjacent subcarriers may use a same communication channel for boosting noncoherent modulation.

Figure 4:
FIGS. 4 and 5 illustrate examples of noncoherent mapping configurations that support boosted noncoherent modulation in accordance with aspects of the present disclosure.

FIG. 4 illustrates an example of a noncoherent mapping configuration 400 that supports boosted noncoherent modulation in accordance with aspects of the present disclosure. The noncoherent mapping configuration 400 may implement or be implemented by aspects of wireless communications systems 100 and 200 or may implement aspects of the wireless communications systems 100 and 200 as described with reference to FIGS. 1 and 2, respectively. For example, the noncoherent mapping configuration 400 may be based on a configuration provided by a base station 105 and implemented by the base station 105 or a UE 115, or both. The noncoherent mapping configuration 400 may support repetition, adjacent mapping of data subcarriers, alternating mapping of data subcarriers, etc. The base station 105 or the UE 115, or both, may thereby support wireless communications using the noncoherent mapping configuration 400.

The base station 105 or the UE 115, or both, may map information bits (e.g., data bits) according to various configurations associated with a resource block. According to a configuration 405 (e.g., a repetition configuration), the base station 105 or the UE 115, or both, may map data (e.g., 1) to a subcarrier of the resource block, and may repeat the mapping of the data to additional subcarriers based on the repetition rate and the boosting factor. For example, for a repetition value R=2, the base station 105 or the UE 115, or both, may map information bits (e.g., data bits) to a first subcarrier and may repeat the mapping on a separate resource element based on the repetition (e.g., $s_{10}$ is mapped twice based on the repetition R=2). In some cases, the boosted subcarriers may increase the coding rate according to the repetition factor used (e.g., the rate may be twice what it was before the repetition for R=2). In some cases, according to a noncoherent mapping, the base station 105 or the UE 115, or both, may multiply adjacent subcarriers (e.g., $s_{10}*s_{20}$ and $s_{10}*s_{20}*s_{30}$), map the multiplied subcarriers to a resource element of the resource block, and repeat the mapping based on the repetition.

According to a configuration 410, the base station 105 or the UE 115, or both, may map information bits (e.g., data bits) on adjacent subcarriers in different portions of a resource block. For example, the base station 105 or the UE 115, or both, may identify a first and second symbol period of the resource block. The base station 105 or the UE 115, or both, may map information bits (e.g., data bits) on adjacent subcarriers of the first symbol period of the resource block according to the boosting factor (e.g., R=2 for a boost of √2 for the example of configuration 1). For example, the base station 105 or the UE 115, or both, may map resource elements to include the data $\sqrt{2}$, $\sqrt{2}*s_{10}$, $\sqrt{2}*s_{10}*s_{20}$, and $\sqrt{2}*s_{10}*s_{20}*s_{30}$ in the first symbol period of the resource block. The base station 105 or the UE 115, or both, may map a second number of adjacent subcarriers to resource elements of the second symbol period of the resource block. In some cases, the second number of adjacent subcarriers may be silent or empty subcarriers corresponding to a number of null bits (e.g., each subcarrier may correspond to a value of 0) that may be used to perform noise coherence estimation. In some examples, mapping data according to the configuration 410 may provide high reliability when experiencing a large delay spread associated with a channel.

In some other examples, according to a configuration 415, the base station 105 or the UE 115, or both, may map a first set of subcarriers to a first set of locations (e.g., resource elements) on the resource block, and may map a second set of subcarriers (e.g., silent subcarriers) to a second set of locations (e.g., resource elements) on the resource block. In some examples, the mapping may include alternating or interleaving a first set of data subcarriers and a second set of silent subcarriers on resource block, such that the spacing between the data subcarriers is equal. For example, data corresponding to $\sqrt{2}$, $\sqrt{2}*s_{10}$, $\sqrt{2}*s_{10}*s_{20}$, and $\sqrt{2}*s_{10}*s_{20}*s_{30}$ may be alternated with null data (e.g., 0) on the resource block corresponding to configuration 415.

The second set of silent subcarriers may maintain a transmit energy of a signal associated with the subcarriers, and may be used to perform noise coherence estimation. In some cases, such equal spacing between data may increase channel diversity, and the base station 105 or the UE 115, or both, may dynamically configure the subcarrier spacing based on the mapping. In some examples, the base station 105 or the UE 115, or both, may also configure a frequency shift between the first and second set of subcarriers based on the mapping. The base station 105 or the UE 115, or both, may promote enhanced efficiency for high reliability and low latency wireless communications in 5G systems, among other benefits using the noncoherent mapping configuration 400.

Figure 5:
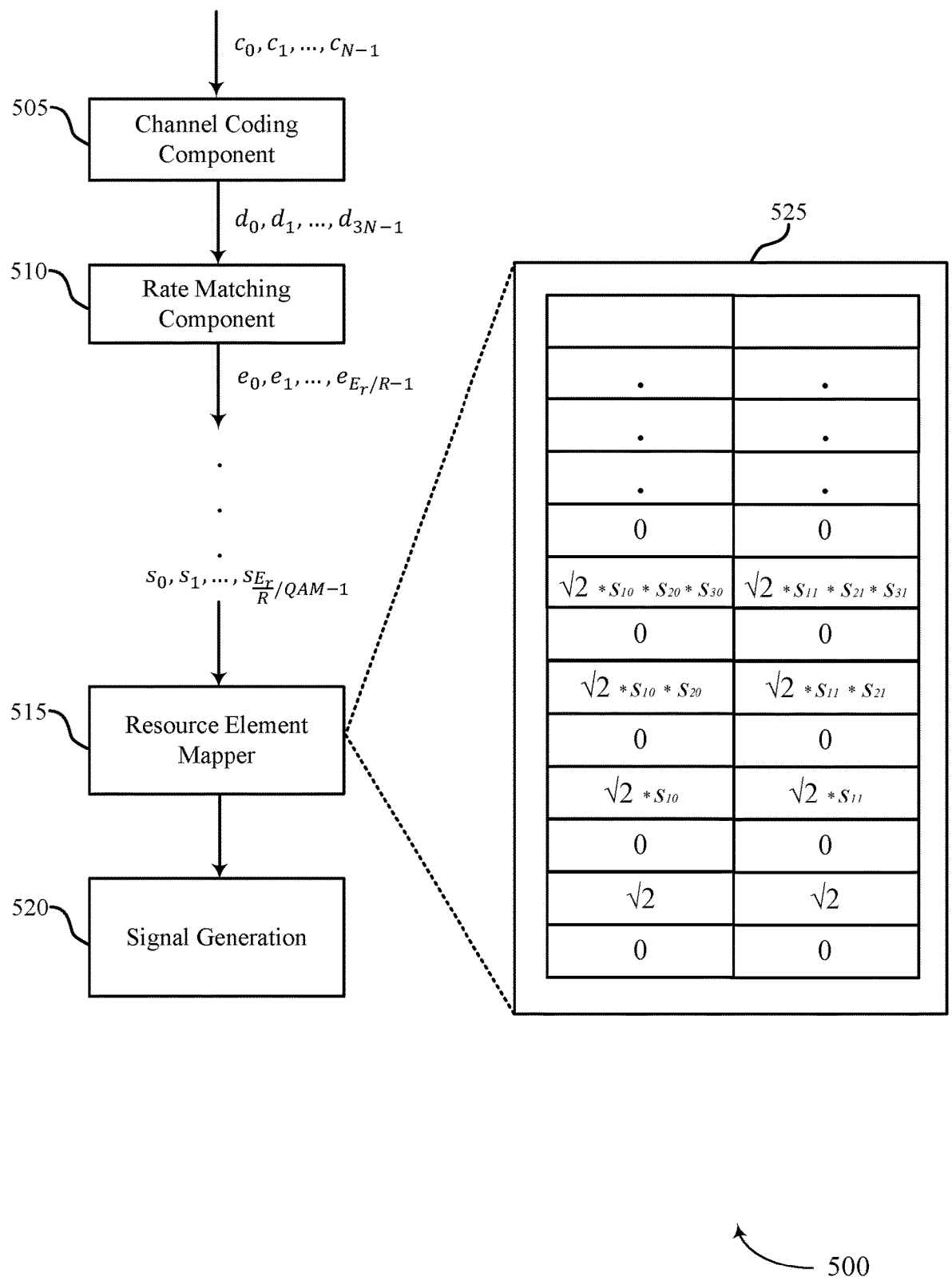

FIG. 5 illustrates an example of a method 500 that supports boosted noncoherent modulation in accordance with aspects of the present disclosure. The method 500 may implement or be implemented by aspects of the wireless communications systems 100 and 200 or may implement aspects of the wireless communications systems 100 and 200 as described with reference to FIGS. 1 and 2, respectively. For example, the operations of method 500 may be implemented by a transmitting device (e.g., a base station 105, a UE 115) or its components as described herein. For example, the operations of method 500 may be performed by a communications manager as described with reference to FIGS. 7 through 10. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

A transmitting device may support increasing an SNR for boosting a signal and for repetition of the signal. The transmitting device may be configured with a resource element mapper. The resource element mapper may be implemented in hardware, code (e.g., software or firmware) executed by a processor, or any combination thereof. If implemented in code executed by a processor, the functions of the resource element mapper may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The resource element mapper may create a boosted signal by applying a boosting factor based on a repetition rate R. In some cases, the boosting factor may be predefined.

The resource element mapper may apply a boosting factor of $\sqrt{R}$ to boost the signal according to a mapping configuration. The resource element mapper may apply the boosting factor to one or more subcarriers of a resource block to boost the signal. To maintain a same total transmitted energy of the signal (e.g., the same energy as a non-boosted signal), the resource element mapper may use a number of silent subcarriers along with the boosted subcarriers. For noncoherent modulation, the silent subcarriers may be used to estimate noise (e.g., Rnn estimation). The transmitting device may be configured to scale a rate of rate matching based on the boosting factor. For example, for R=2, the transmitting device may use half of the original subcarriers to transmit data. In such examples, the resource block size might not change, and the total number of data bits may also be the same, which may increase the rate according to the repetition factor used (e.g., the rate may be twice what it was before the repetition for a repetition R=2).

At 505, the transmitting device may encode, at a channel coding component, information bits $c_0, c_1, \ldots, c_{N-1}$, where N is a total number of information bits. The channel coding component may be implemented in hardware, code (e.g., software or firmware) executed by a processor, or any combination thereof. If implemented in code executed by a processor, the functions of the channel coding component may be executed by a general-purpose processor, a DSP, an ASIC, a FPGA or other programmable logic device, discrete gate or transistor logic, discrete hardware components, or any combination thereof designed to perform the functions described in the present disclosure.

In some examples, the transmitting device may encode the information bits based on a boosting factor R to generate encoded bits $d_0, d_1, \ldots, d_{3N-1}$. At 510, the transmitting device may rate match, via a rate matching component, the encoded bits $d_0, d_1, \ldots, d_{3N-1}$. In some examples, the channel coding component may perform a 1/3 rate encoding. For example, for every single information bit, the channel coding component may generate three encoded bits. The rate matching component may be implemented in hardware, code (e.g., software or firmware) executed by a processor, or any combination thereof. If implemented in code executed by a processor, the functions of the rate matching component may be executed by a general-purpose processor, a DSP, an ASIC, a FPGA or other programmable logic device, discrete gate or transistor logic, discrete hardware components, or any combination thereof designed to perform the functions described in the present disclosure During rate matching, the bits are rate matched according to a coding rate $E_r$, which may be scaled by the boosting factor R. For example, the coding rate for the input bits may be scaled by a factor of $E_r/R-1$. After rate matching, the bits may be denoted $e_0, e_1, \ldots, e_{E_r/R-1}$. The boosting factor may be applied to the rate matched bits, and the boosted rate matched bits (denoted $f_0, f_1, \ldots, f_{G-1}$, where G is the total number of coded bits) may be input to the resource element mapper at 515.

The resource element mapper may map the bits to resource elements of resource block 525 based on a mapping configuration (e.g., a mapping configuration as described herein). The transmitting device may map a first set of subcarriers to a first set of locations (e.g., resource elements) on the resource block 525, and may map a second set of subcarriers (e.g., silent or empty subcarriers) to a second set of locations (e.g., resource elements) on the resource block 525. The resource element mapper may map the data to subcarriers according to the boosting factor $$(e.g., s_0, s_1, \ldots, s_{\frac{E_r}{R}/QAM-1}).$$

In some examples, the mapping may include alternating or interleaving a first set of data subcarriers and a second set of silent or empty subcarriers on resource block such that the spacing between the data subcarriers is equal. For example, data corresponding to $\sqrt{2}$, $\sqrt{2}*s_{10}$, $\sqrt{2}*s_{10}*s_{20}$, and $\sqrt{2}*s_{10}*s_{20}*s_{30}$ may be alternated with null data (e.g., 0) on the resource block 525.

In some other examples, the resource element mapper may map data to adjacent subcarriers on a first location of resource block 525, and may map null subcarriers to a second location of resource block 525. In some cases, the second set of empty or silent subcarriers may maintain a transmitted energy of the signal, and the receiving device may use the empty subcarriers to perform noise coherence estimation. At 520, the transmitting device may generate an OFDM signal based on the mapping at 515, where the OFDM signal is boosted according to the boosted subcarriers and mapping configuration of resource block 525.

Figure 6:
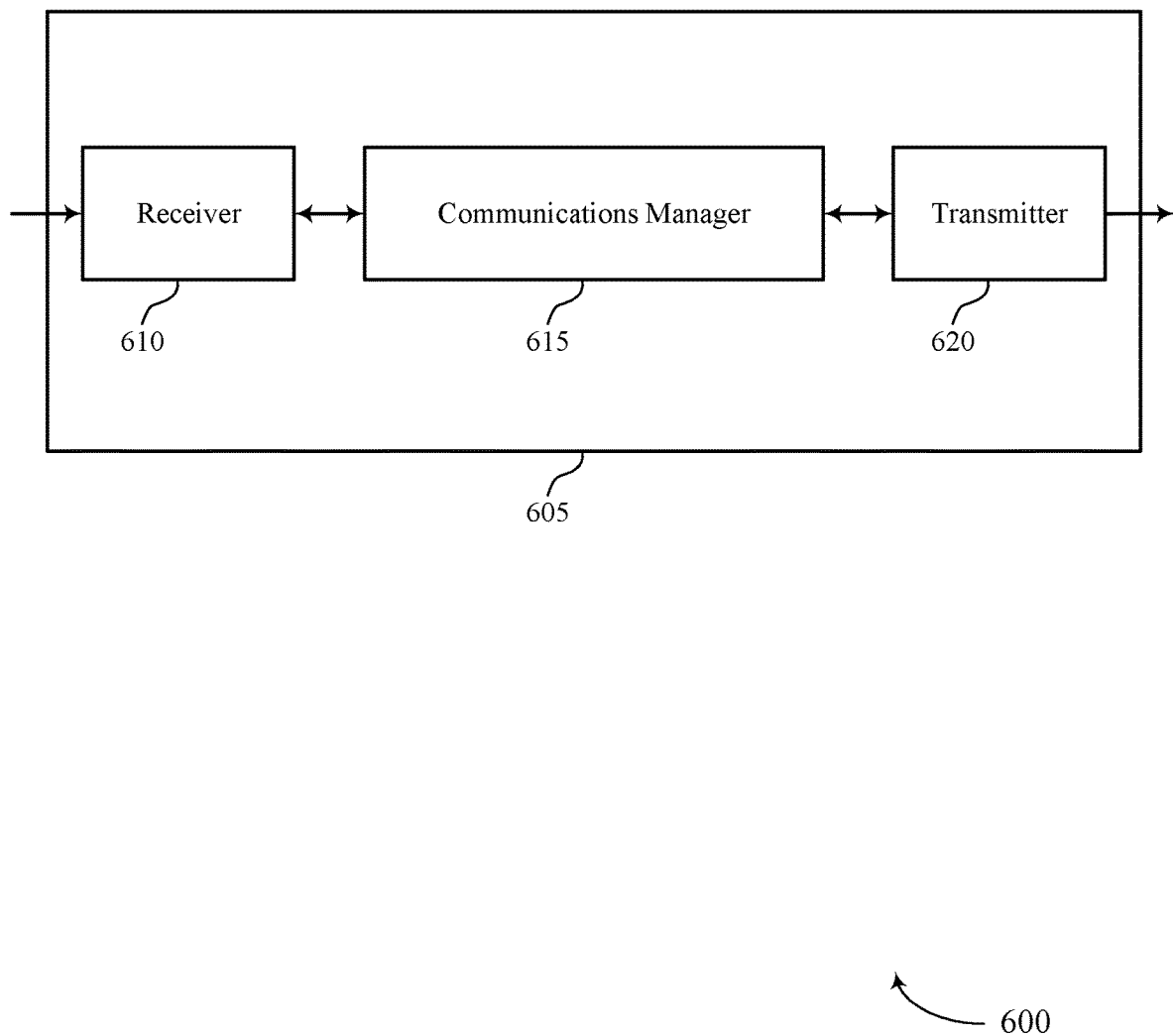
FIGS. 6 and 7 show block diagrams of devices that support boosted noncoherent modulation in accordance with aspects of the present disclosure.

FIG. 6 shows a block diagram 600 of a device 605 that supports boosted noncoherent modulation in accordance with aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to boosted noncoherent modulation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may encode a set of data bits to transmit to a receiving device on a set of subcarriers based on a boosting factor. The communications manager 615 may map the set of encoded data bits to a resource block including a first subset of subcarriers corresponding to the set of encoded data bits and a second subset of subcarriers corresponding to a set of null bits. The communications manager 615 may generate a signal including the set of encoded data bits based on the mapping, and transmit the generated signal to the receiving device.

The communications manager 615 may receive a modulated signal from a transmitting device on a set of subcarriers. The communications manager 615 may de-map the modulated signal to a first subset of subcarriers and a second subset of subcarriers based on a boosting factor. The communications manager 615 may decode the first subset of subcarriers to a first set of data bits and the second subset of subcarriers to a second set of data bits. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

The communications manager 615 may be implemented as an integrated circuit or chipset for a mobile device modem, and the receiver 610 and the transmitter 620 may be implemented as analog components (e.g., amplifiers, filters, antennas, etc.) coupled with the mobile device modem to enable wireless transmission and reception. The communications manager 615 as described herein may be implemented to realize one or more potential advantages. Various implementations may enable implementing increased SNR by boosting a transmitted signal or by signal repetition. At least one implementation may enable the communications manager 615 to effectively apply a boosting factor to a number of mapped subcarriers of a transmitted signal, and include a number of silent subcarriers to maintain a total energy of the transmitted signal. At least one implementation may enable the communications manager 615 to map the boosted subcarriers according to a number of different mapping configurations. Based on implementing the signal boosting and/or repetition techniques as described herein, one or more processors of the device 605 (e.g., processor(s) controlling or incorporated with one or more of the receiver 610, the communications manager 615, and the transmitter 620) may increase the SNR and/or gain of the transmitted signal.

Figure 7:
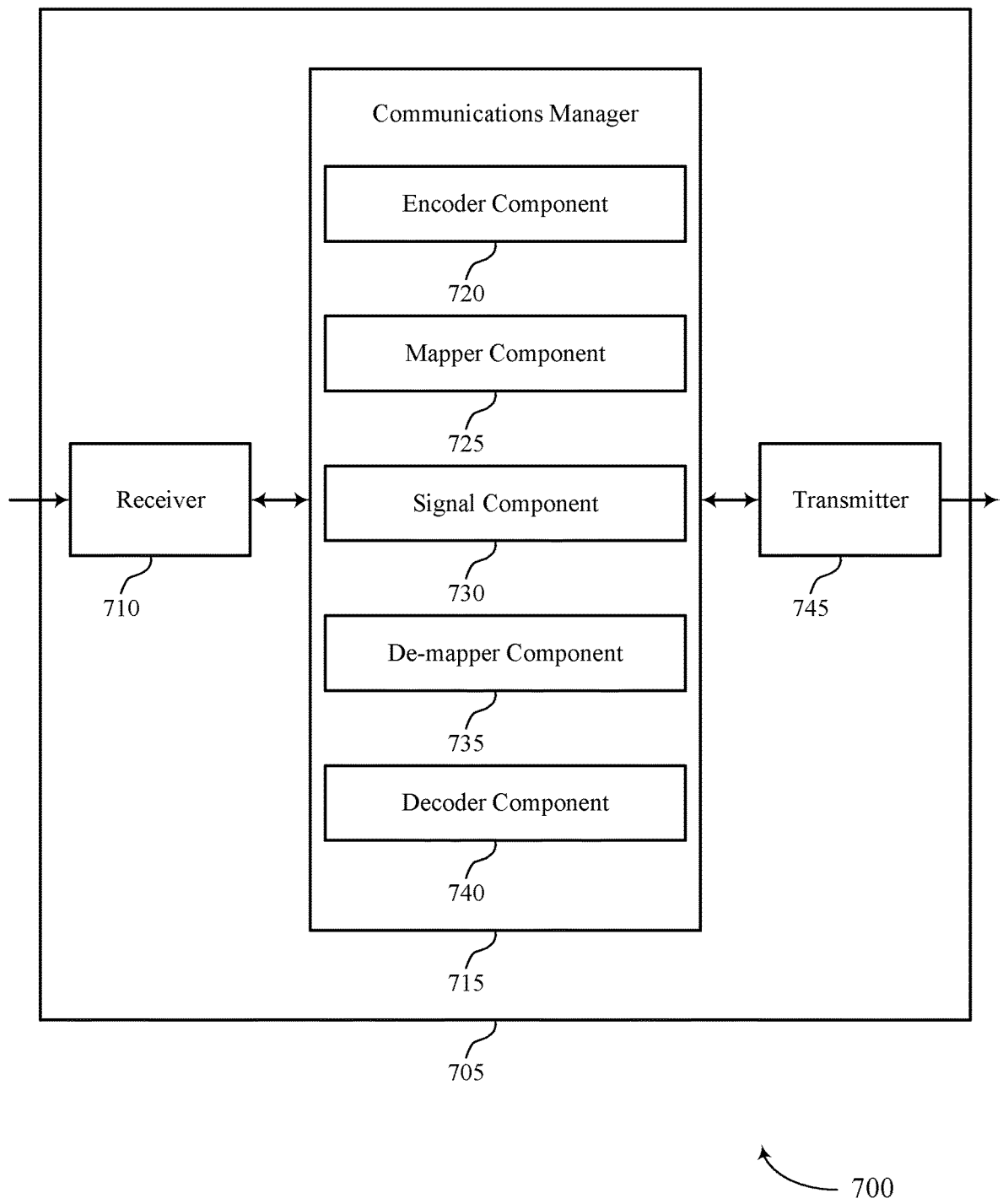

FIG. 7 shows a block diagram 700 of a device 705 that supports boosted noncoherent modulation in accordance with aspects of the present disclosure. The device 705 may be an example of aspects of a device 605 or a device 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to boosted noncoherent modulation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an encoder component 720, a mapper component 725, a signal component 730, a de-mapper component 735, and a decoder component 740. The communications manager 715 may be an example of aspects of the communications manager 910 described herein.

The encoder component 720 may encode a set of data bits to transmit to a receiving device on a set of subcarriers based on a boosting factor. The mapper component 725 may map the set of encoded data bits to a resource block including a first subset of subcarriers corresponding to the set of encoded data bits and a second subset of subcarriers corresponding to a set of null bits. The signal component 730 may generate a signal including the set of encoded data bits based on the mapping and transmit the generated signal to the receiving device.

The signal component 730 may receive a modulated signal from a transmitting device on a set of subcarriers. The de-mapper component 735 may de-map the modulated signal to a first subset of subcarriers and a second subset of subcarriers based on a boosting factor. The decoder component 740 may decode the first subset of subcarriers to a first set of data bits and the second subset of subcarriers to a second set of data bits.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
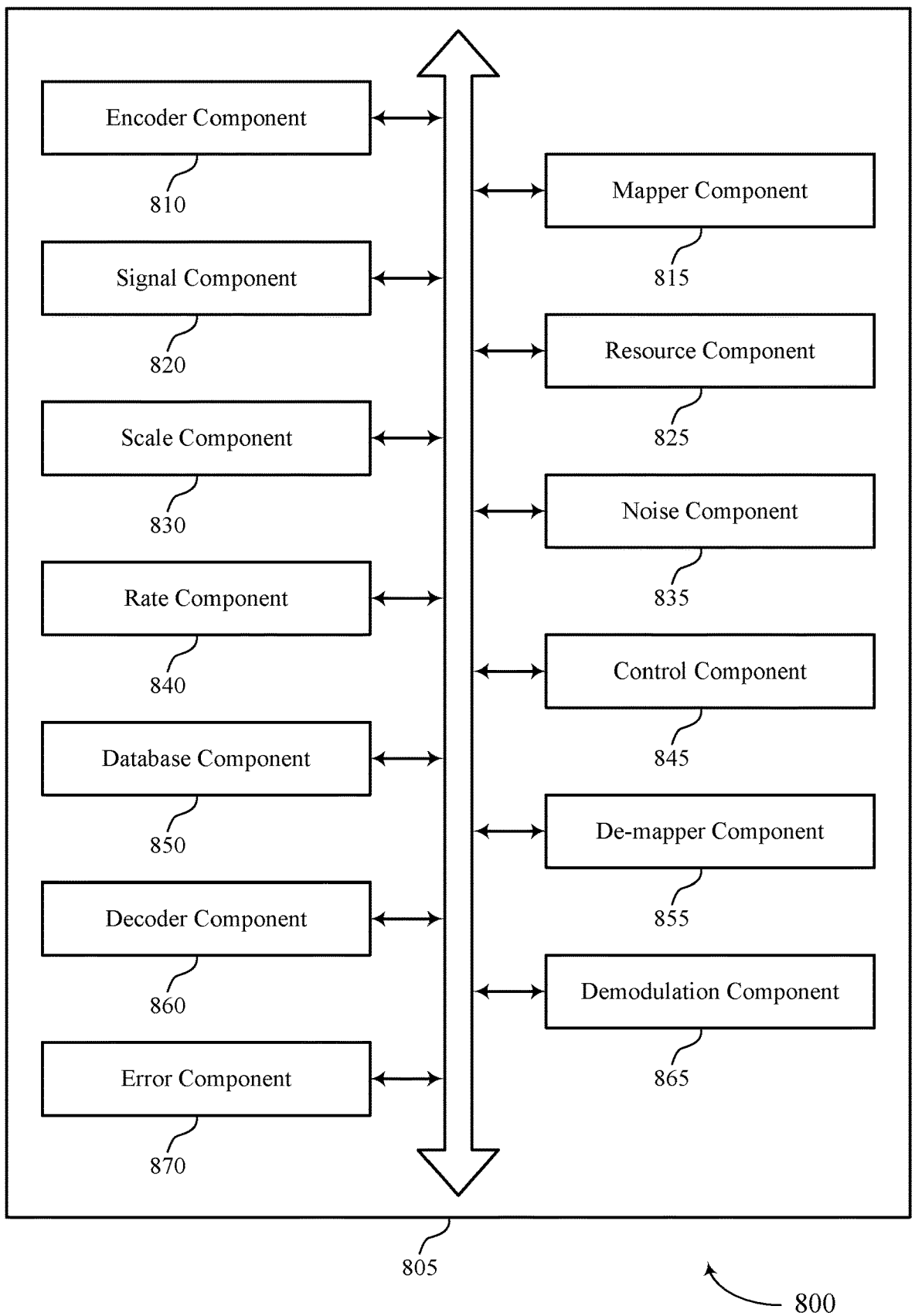
FIG. 8 shows a block diagram of a communications manager that supports boosted noncoherent modulation in accordance with aspects of the present disclosure.

FIG. 8 shows a block diagram 800 of a communications manager 805 that supports boosted noncoherent modulation in accordance with aspects of the present disclosure. The communications manager 805 may be an example of aspects of a communications manager 615, a communications manager 715, or a communications manager 910 described herein. The communications manager 805 may include an encoder component 810, a mapper component 815, a signal component 820, a resource component 825, a scale component 830, a noise component 835, a rate component 840, a control component 845, a database component 850, a de-mapper component 855, a decoder component 860, a demodulation component 865, and an error component 870.

Each of these components may communicate, directly or indirectly, with one another (e.g., via one or more buses).

The encoder component 810 may encode a set of data bits to transmit to a receiving device on a set of subcarriers based on a boosting factor. In some cases, the boosting factor is a square root of a repetition factor. In some cases, a value of the boosting factor is based on an MCS value, a constellation mapping configuration, a frequency allocation parameter, a channel condition, a configuration of the transmitting device, or a configuration of the receiving device, or any combination thereof. The mapper component 815 may map the set of encoded data bits to a resource block including a first subset of subcarriers corresponding to the set of encoded data bits and a second subset of subcarriers corresponding to a set of null bits. In some cases, the mapping includes a non-coherent modulation mapping. The encoder component 810 may transmit an RRC connection establishment message comprising a set of parameters indicating the boosting factor per MCS.

The signal component 820 may generate a signal including the set of encoded data bits based on the mapping. In some examples, the signal component 820 may transmit the generated signal to the receiving device. In some examples, the signal component 820 may receive a modulated signal from a transmitting device on a set of subcarriers. In some examples, determining that the second subset of subcarriers includes a set of silent subcarriers. In some examples, the signal component 820 may assign the set of silent subcarriers for noise coherence estimation. In some cases, the generated signal includes a same total energy equal to a second signal generated without the boosting factor. In some cases, a total energy of the modulated signal is based on the boosting factor.

The de-mapper component 855 may de-map the modulated signal to a first subset of subcarriers and a second subset of subcarriers based on a boosting factor. In some examples, the de-mapper component 855 may identify the boosting factor associated with the modulated signal. The decoder component 860 may decode the first subset of subcarriers to a first set of data bits and the second subset of subcarriers to a second set of data bits. In some examples, the decoder component 860 may where decoding the first subset of subcarriers and the second subset of subcarriers is based on the scaled decoding rate. The decoder component 860 may receive an RRC connection establishment message comprising a set of parameters indicating the boosting factor per MCS.

The resource component 825 may identify a first symbol period in the resource block adjacent to a second symbol period in the resource block based on the mapping. In some examples, the resource component 825 may allocate the first subset of subcarriers to the first symbol period and the second subset of subcarriers to the second symbol period, where mapping the set of encoded data bits to the resource block is based on the allocating. In some examples, the resource component 825 may identify a first spacing for a first set of symbol periods in the resource block and a second spacing for a second set of symbol periods in the resource block, where the first spacing for the first set of symbol periods is equal to the second spacing for the second set of symbol periods.

In some examples, the resource component 825 may allocate the first subset of subcarriers to the first set of symbol periods and the second subset of subcarriers to the second set of symbol periods, where mapping the set of encoded data bits to the resource block is based on the allocating. In some examples, the resource component 825 may determine a frequency shift between the first subset of subcarriers and the second subset of subcarriers based on the mapping, where generating the signal including the set of encoded data bits is based on the frequency shift between the first subset of subcarriers and the second subset of subcarriers. In some cases, the first set of symbol periods is interleaved with the second set of symbol periods.

The scale component 830 may scale the second subset of subcarriers based on the boosting factor and a total energy of the generated signal, where transmitting the generated signal to the receiving device is based on scaling the second subset of subcarriers. In some examples, the scale component 830 may scale a decoding rate of the first subset of subcarriers and the second subset of subcarriers based on the boosting factor. The noise component 835 may perform a noise coherence estimation for the generated signal using the second subset of subcarriers based on the scaling.

The rate component 840 may rate match the set of encoded data bits based on the boosting factor. The control component 845 may transmit a DCI message including an indication of the boosting factor. In some examples, the control component 845 may receive a DCI message including an indication of the boosting factor, where de-mapping the modulated signal to the first subset of subcarriers and the second subset of subcarriers is based on receiving the DCI message including the indication of the boosting factor.

The database component 850 may identify the boosting factor in a lookup table, where encoding the set of data bits to transmit to the receiving device is based on identifying the boosting factor in the lookup table. In some examples, the database component 850 may identify the boosting factor in a lookup table, where de-mapping the modulated signal to the first subset of subcarriers and the second subset of subcarriers is based on identifying the boosting factor in the lookup table.

The demodulation component 865 may demodulate the first subset of subcarriers and the second subset of subcarriers based on the boosting factor. The error component 870 may perform an error check procedure on the first set of data bits. In some examples, the error component 870 may decode the first set of data bits based on the first set of data bits passing the error check procedure. In some cases, the error check procedure includes a cyclic redundancy check procedure.

Figure 9:
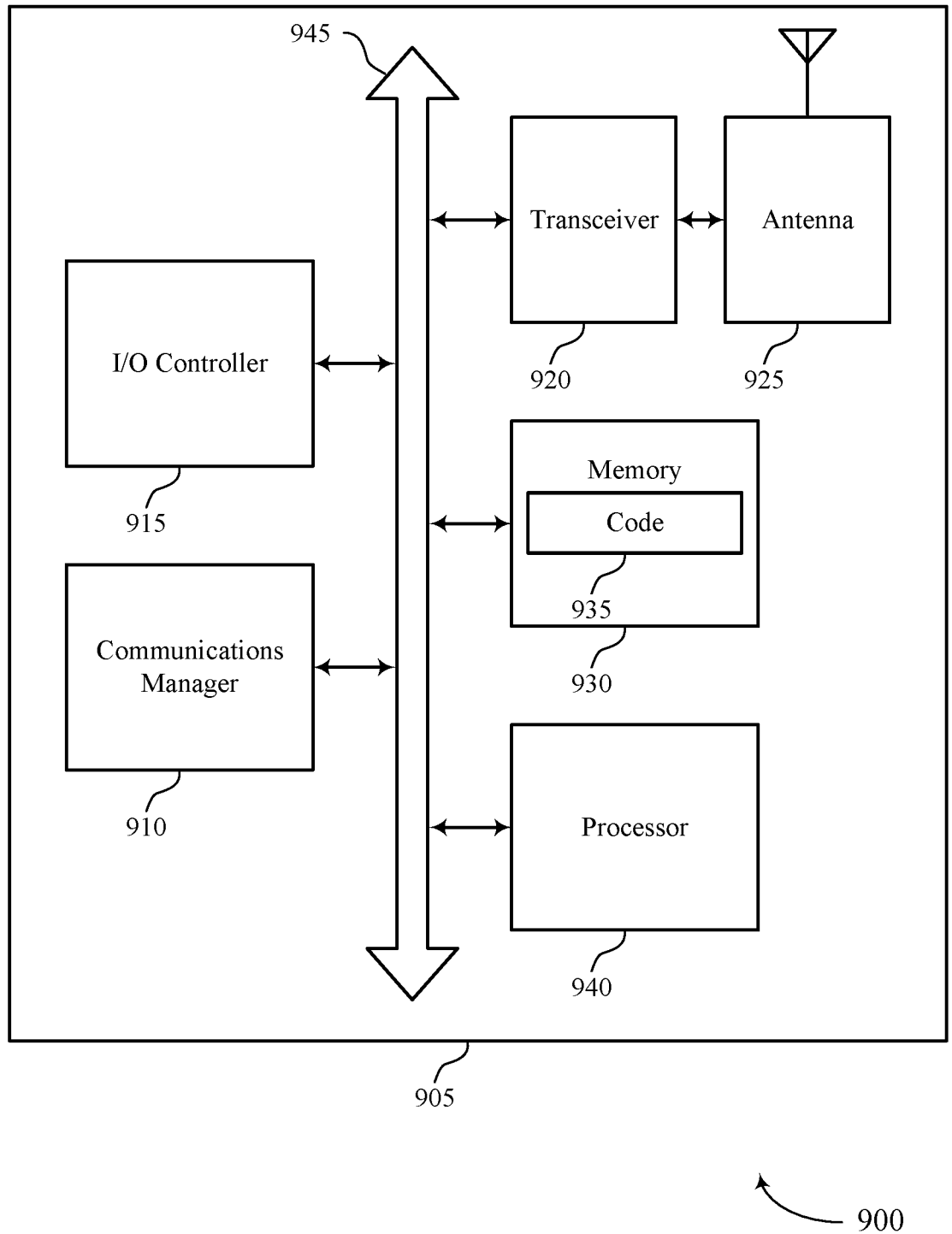
FIG. 9 shows a diagram of a system including a device that supports boosted noncoherent modulation in accordance with aspects of the present disclosure.

FIG. 9 shows a diagram of a system 900 including a device 905 that supports boosted noncoherent modulation in accordance with aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, a processor 940, and a coding manager 950. These components may be in electronic communication via one or more buses (e.g., bus 945).

The communications manager 910 may encode a set of data bits to transmit to a receiving device on a set of subcarriers based on a boosting factor. The communications manager 910 may map the set of encoded data bits to a resource block including a first subset of subcarriers corresponding to the set of encoded data bits and a second subset of subcarriers corresponding to a set of null bits. The communications manager 910 may generate a signal including the set of encoded data bits based on the mapping, and transmit the generated signal to the receiving device. Additionally or alternatively, the communications manager 910 may receive a modulated signal from a transmitting device on a set of subcarriers. The communications manager 910 may de-map the modulated signal to a first subset of subcarriers and a second subset of subcarriers based on a boosting factor. The communications manager 910 may decode the first subset of subcarriers to a first set of data bits and the second subset of subcarriers to a second set of data bits.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting boosted noncoherent modulation).

Figure 10:
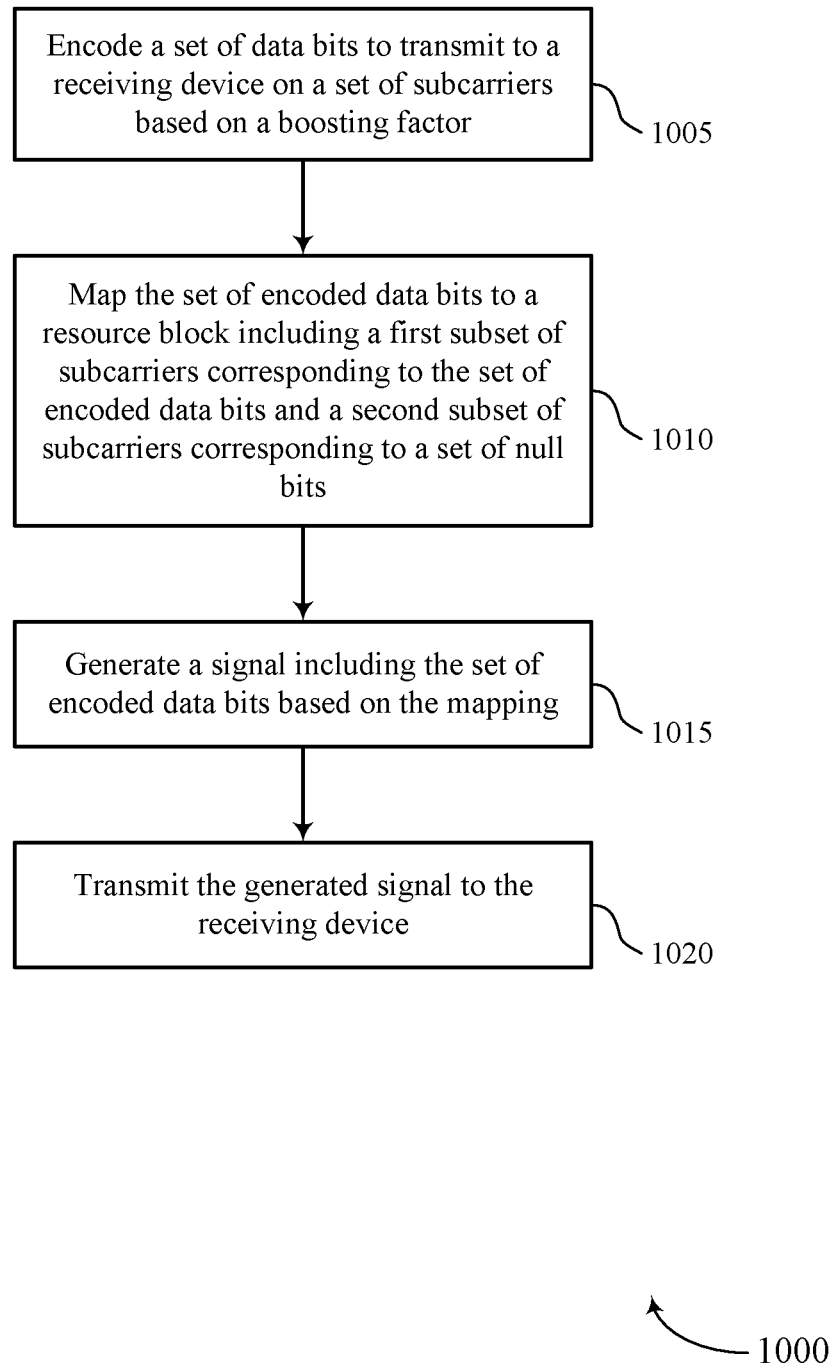
FIGS. 10 through 16 show flowcharts illustrating methods that support boosted noncoherent modulation in accordance with aspects of the present disclosure.

FIG. 10 shows a flowchart illustrating a method 1000 that supports boosted noncoherent modulation in accordance with aspects of the present disclosure. The operations of method 1000 may be implemented by a transmitting device (e.g., a base station 105, a UE 115) or its components as described herein. For example, the operations of method 1000 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1005, a transmitting device may encode a set of data bits to transmit to a receiving device on a set of subcarriers based on a boosting factor. The operations of 1005 may be performed according to the methods described herein. In some examples, aspects of the operations of 1005 may be performed by an encoder component as described with reference to FIGS. 6 through 9.

At 1010, the transmitting device may map the set of encoded data bits to a resource block including a first subset of subcarriers corresponding to the set of encoded data bits and a second subset of subcarriers corresponding to a set of null bits. The operations of 1010 may be performed according to the methods described herein. In some examples, aspects of the operations of 1010 may be performed by a mapper component as described with reference to FIGS. 6 through 9.

At 1015, the transmitting device may generate a signal including the set of encoded data bits based on the mapping. The operations of 1015 may be performed according to the methods described herein. In some examples, aspects of the operations of 1015 may be performed by a signal component as described with reference to FIGS. 6 through 9.

At 1020, the transmitting device may transmit the generated signal to the receiving device. The operations of 1020 may be performed according to the methods described herein. In some examples, aspects of the operations of 1020 may be performed by a signal component as described with reference to FIGS. 6 through 9.

Figure 11:
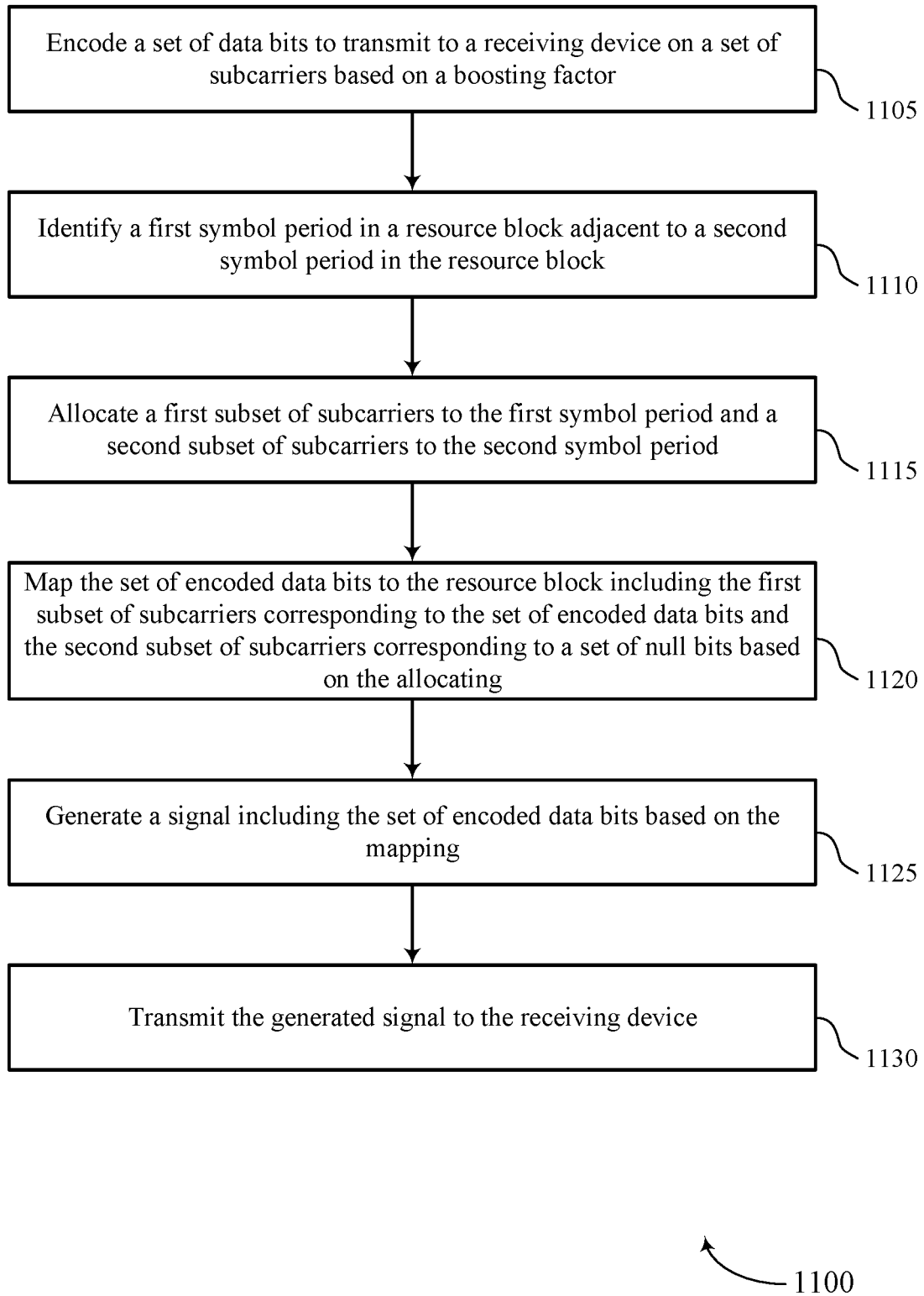

FIG. 11 shows a flowchart illustrating a method 1100 that supports boosted noncoherent modulation in accordance with aspects of the present disclosure. The operations of method 1100 may be implemented by a transmitting device (e.g., a base station 105, a UE 115) or its components as described herein. For example, the operations of method 1100 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1105, a transmitting device may encode a set of data bits to transmit to a receiving device on a set of subcarriers based on a boosting factor. The operations of 1105 may be performed according to the methods described herein. In some examples, aspects of the operations of 1105 may be performed by an encoder component as described with reference to FIGS. 6 through 9.

At 1110, the transmitting device may identify a first symbol period in a resource block adjacent to a second symbol period in the resource block. The operations of 1110 may be performed according to the methods described herein. In some examples, aspects of the operations of 1110 may be performed by a resource component as described with reference to FIGS. 6 through 9.

At 1115, the transmitting device may allocate a first subset of subcarriers to the first symbol period and a second subset of subcarriers to the second symbol period. The operations of 1115 may be performed according to the methods described herein. In some examples, aspects of the operations of 1115 may be performed by a resource component as described with reference to FIGS. 6 through 9.

At 1120, the transmitting device may map the set of encoded data bits to the resource block including the first subset of subcarriers corresponding to the set of encoded data bits and the second subset of subcarriers corresponding to a set of null bits based on the allocating. The operations of 1120 may be performed according to the methods described herein. In some examples, aspects of the operations of 1120 may be performed by a mapper component as described with reference to FIGS. 6 through 9.

At 1125, the transmitting device may generate a signal including the set of encoded data bits based on the mapping. The operations of 1125 may be performed according to the methods described herein. In some examples, aspects of the operations of 1125 may be performed by a signal component as described with reference to FIGS. 6 through 9.

At 1130, the transmitting device may transmit the generated signal to the receiving device. The operations of 1130 may be performed according to the methods described herein. In some examples, aspects of the operations of 1130 may be performed by a signal component as described with reference to FIGS. 6 through 9.

Figure 12:
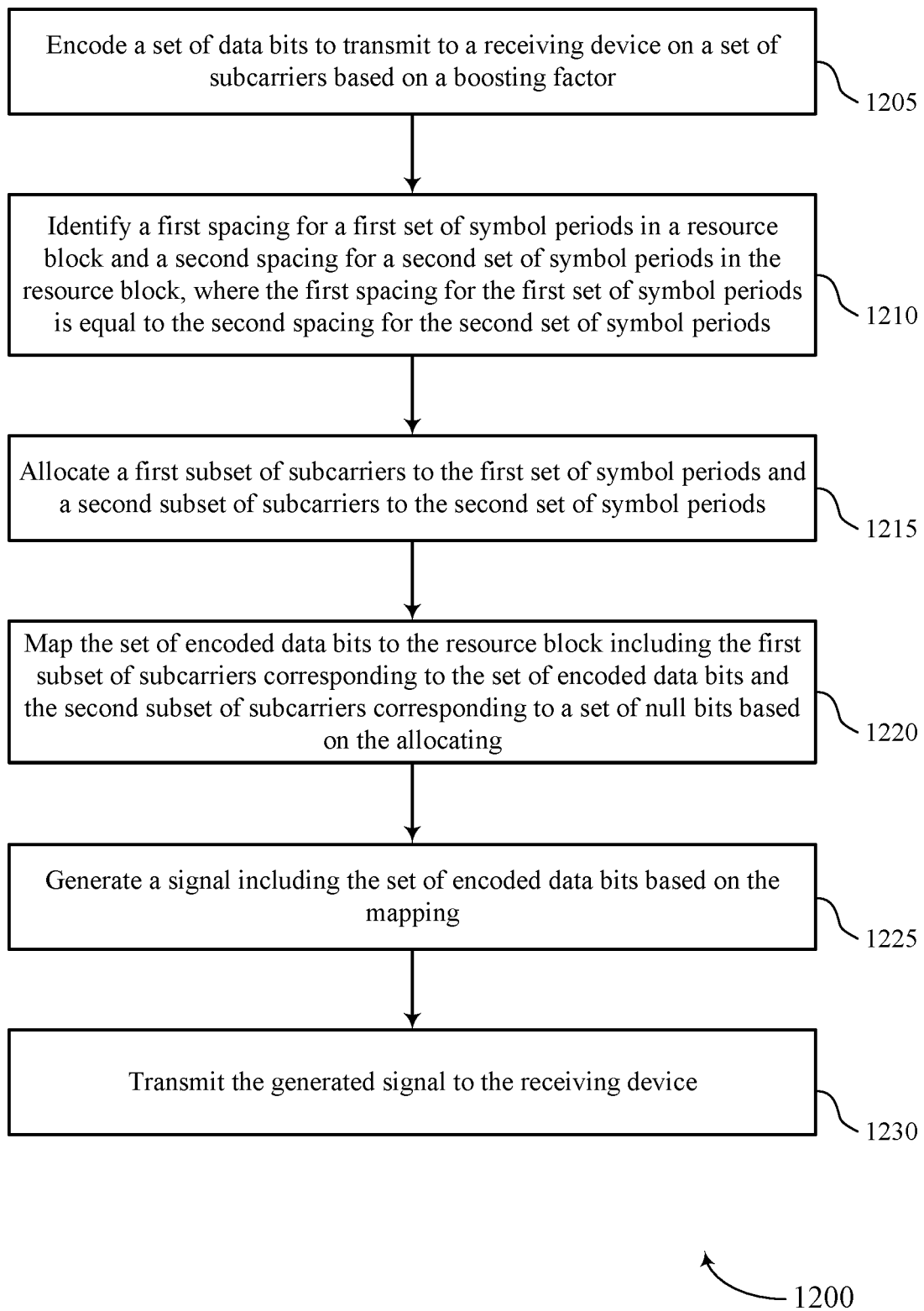

FIG. 12 shows a flowchart illustrating a method 1200 that supports boosted noncoherent modulation in accordance with aspects of the present disclosure. The operations of method 1200 may be implemented by a transmitting device (e.g., a base station 105, a UE 115) or its components as described herein. For example, the operations of method 1200 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1205, a transmitting device may encode a set of data bits to transmit to a receiving device on a set of subcarriers based on a boosting factor. The operations of 1205 may be performed according to the methods described herein. In some examples, aspects of the operations of 1205 may be performed by an encoder component as described with reference to FIGS. 6 through 9.

At 1210, the transmitting device may identify a first spacing for a first set of symbol periods in a resource block and a second spacing for a second set of symbol periods in the resource block, where the first spacing for the first set of symbol periods is equal to the second spacing for the second set of symbol periods. The operations of 1210 may be performed according to the methods described herein. In some examples, aspects of the operations of 1210 may be performed by a resource component as described with reference to FIGS. 6 through 9.

At 1215, the transmitting device may allocate a first subset of subcarriers to the first set of symbol periods and a second subset of subcarriers to the second set of symbol periods. The operations of 1215 may be performed according to the methods described herein. In some examples, aspects of the operations of 1215 may be performed by a resource component as described with reference to FIGS. 6 through 9.

At 1220, the transmitting device may map the set of encoded data bits to the resource block including the first subset of subcarriers corresponding to the set of encoded data bits and the second subset of subcarriers corresponding to a set of null bits based on the allocating. The operations of 1220 may be performed according to the methods described herein. In some examples, aspects of the operations of 1220 may be performed by a mapper component as described with reference to FIGS. 6 through 9.

At 1225, the transmitting device may generate a signal including the set of encoded data bits based on the mapping. The operations of 1225 may be performed according to the methods described herein. In some examples, aspects of the operations of 1225 may be performed by a signal component as described with reference to FIGS. 6 through 9.

At 1230, the transmitting device may transmit the generated signal to the receiving device. The operations of 1230 may be performed according to the methods described herein. In some examples, aspects of the operations of 1230 may be performed by a signal component as described with reference to FIGS. 6 through 9.

Figure 13:
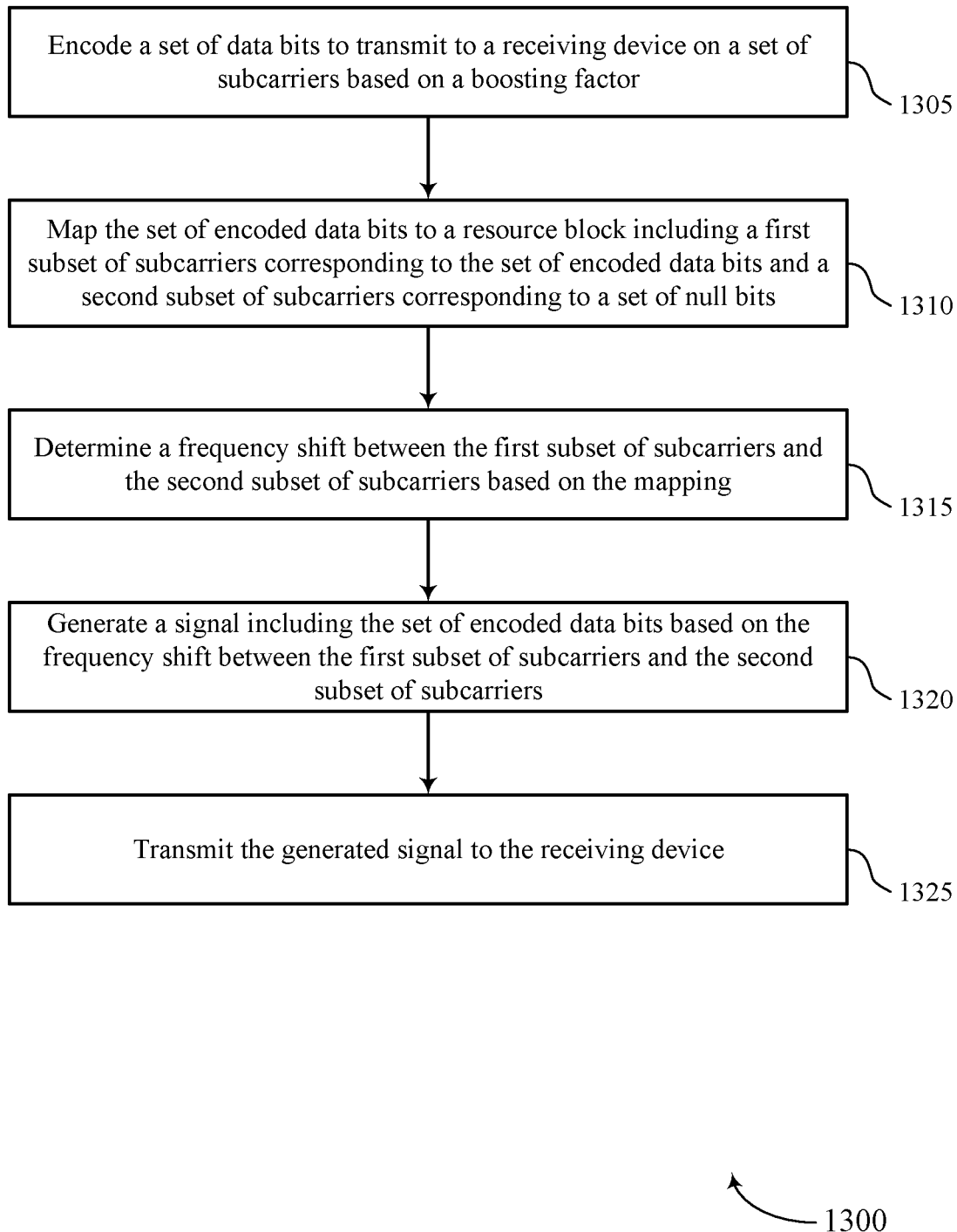

FIG. 13 shows a flowchart illustrating a method 1300 that supports boosted noncoherent modulation in accordance with aspects of the present disclosure. The operations of method 1300 may be implemented by a transmitting device (e.g., a base station 105, a UE 115) or its components as described herein. For example, the operations of method 1300 may be performed by a communications manager as described with reference to FIGS. 6 through 9. In some examples, a transmitting device (e.g., a base station 105, a UE 115) may execute a set of instructions to control the functional elements of the device to perform the functions described below. Additionally or alternatively, a transmitting device (e.g., a base station 105, a UE 115) may perform aspects of the functions described below using special-purpose hardware.

At 1305, a transmitting device may encode a set of data bits to transmit to a receiving device on a set of subcarriers based on a boosting factor. The operations of 1305 may be performed according to the methods described herein. In some examples, aspects of the operations of 1305 may be performed by an encoder component as described with reference to FIGS. 6 through 9.

At 1310, the transmitting device may map the set of encoded data bits to a resource block including a first subset of subcarriers corresponding to the set of encoded data bits and a second subset of subcarriers corresponding to a set of null bits. The operations of 1310 may be performed according to the methods described herein. In some examples, aspects of the operations of 1310 may be performed by a mapper component as described with reference to FIGS. 6 through 9.

At 1315, the transmitting device may determine a frequency shift between the first subset of subcarriers and the second subset of subcarriers based on the mapping. The operations of 1315 may be performed according to the methods described herein. In some examples, aspects of the operations of 1315 may be performed by a resource component as described with reference to FIGS. 6 through 9.

At 1320, the transmitting device may generate a signal including the set of encoded data bits based on the frequency shift between the first subset of subcarriers and the second subset of subcarriers. The operations of 1320 may be performed according to the methods described herein. In some examples, aspects of the operations of 1320 may be performed by a signal component as described with reference to FIGS. 6 through 9.

At 1325, the transmitting device may transmit the generated signal to the receiving device. The operations of 1325 may be performed according to the methods described herein. In some examples, aspects of the operations of 1325 may be performed by a signal component as described with reference to FIGS. 6 through 9.

Figure 14:
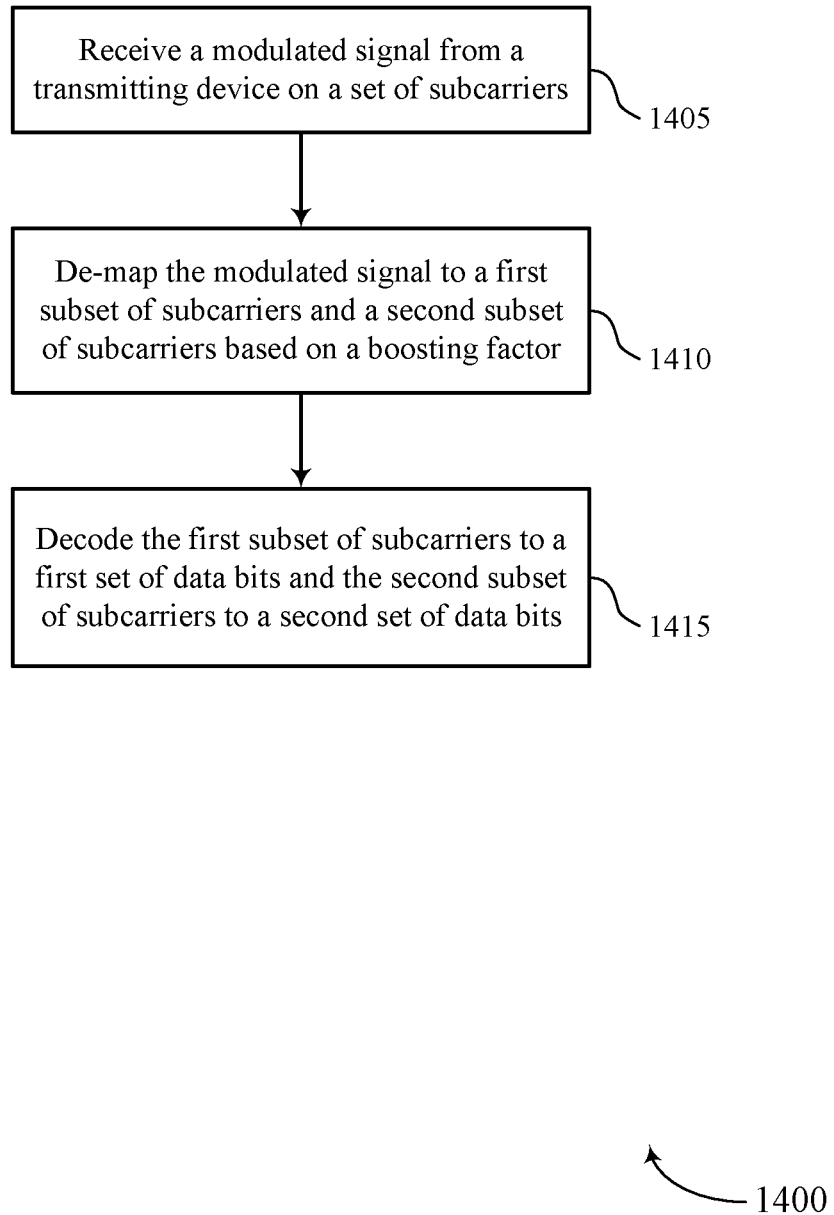

FIG. 14 shows a flowchart illustrating a method 1400 that supports boosted noncoherent modulation in accordance with aspects of the present disclosure. The operations of method 1400 may be implemented by a receiving device (e.g., a base station 105, a UE 115) or its components as described herein. For example, the operations of method 1400 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1405, a receiving device may receive a modulated signal from a transmitting device on a set of subcarriers. The operations of 1405 may be performed according to the methods described herein. In some examples, aspects of the operations of 1405 may be performed by a signal component as described with reference to FIGS. 6 through 9.

At 1410, the receiving device may de-map the modulated signal to a first subset of subcarriers and a second subset of subcarriers based on a boosting factor. The operations of 1410 may be performed according to the methods described herein. In some examples, aspects of the operations of 1410 may be performed by a de-mapper component as described with reference to FIGS. 6 through 9.

At 1415, the receiving device may decode the first subset of subcarriers to a first set of data bits and the second subset of subcarriers to a second set of data bits. The operations of 1415 may be performed according to the methods described herein. In some examples, aspects of the operations of 1415 may be performed by a decoder component as described with reference to FIGS. 6 through 9.

Figure 15:
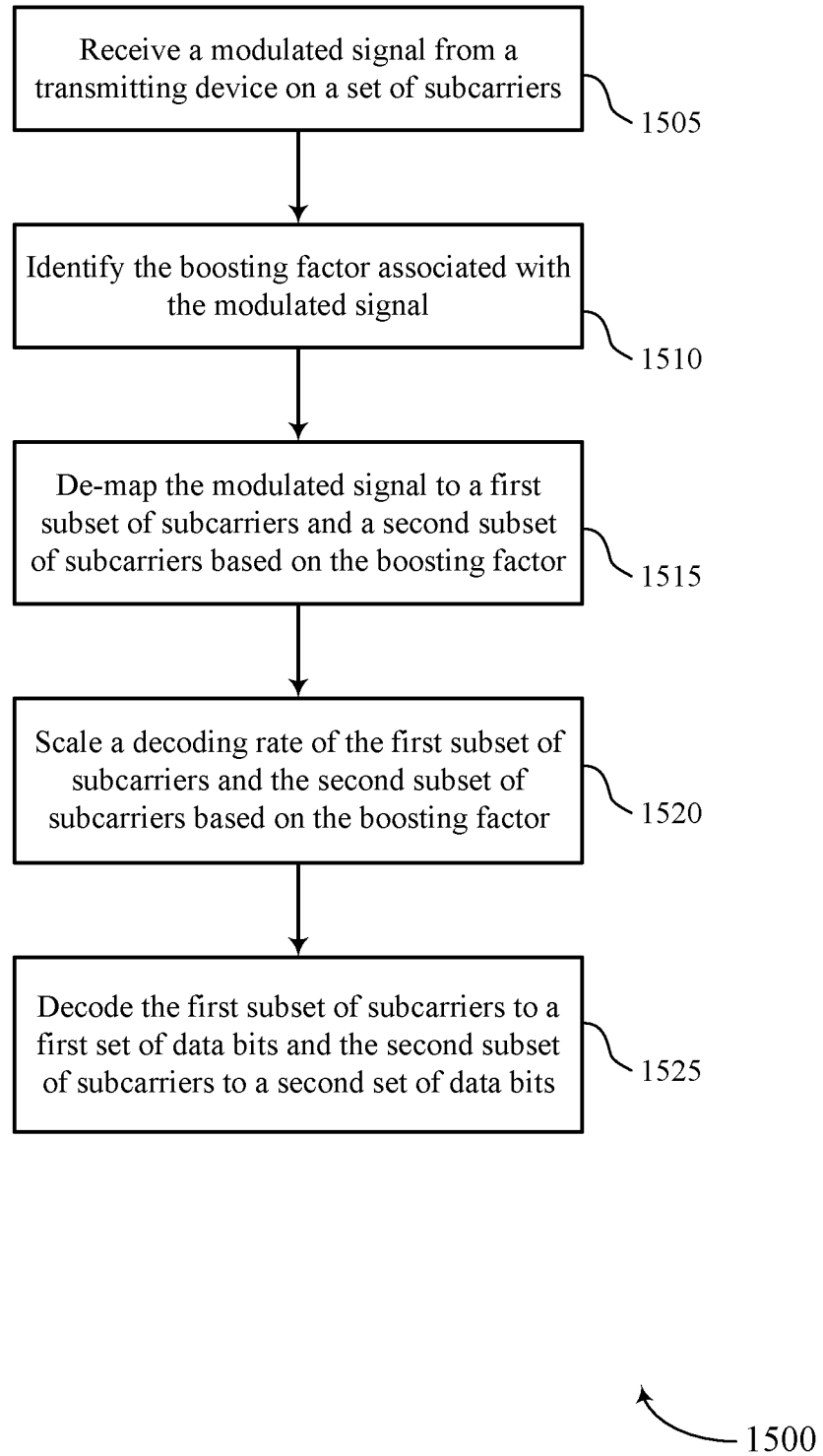

FIG. 15 shows a flowchart illustrating a method 1500 that supports boosted noncoherent modulation in accordance with aspects of the present disclosure. The operations of method 1500 may be implemented by a receiving device (e.g., a base station 105, a UE 115) or its components as described herein. For example, the operations of method 1500 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1505, a receiving device may receive a modulated signal from a transmitting device on a set of subcarriers. The operations of 1505 may be performed according to the methods described herein. In some examples, aspects of the operations of 1505 may be performed by a signal component as described with reference to FIGS. 6 through 9.

At 1510, the receiving device may identify the boosting factor associated with the modulated signal. The operations of 1510 may be performed according to the methods described herein. In some examples, aspects of the operations of 1510 may be performed by a de-mapper component as described with reference to FIGS. 6 through 9.

At 1515, the receiving device may de-map the modulated signal to a first subset of subcarriers and a second subset of subcarriers based on the boosting factor. The operations of 1515 may be performed according to the methods described herein. In some examples, aspects of the operations of 1515 may be performed by a de-mapper component as described with reference to FIGS. 6 through 9.

At 1520, the receiving device may scale a decoding rate of the first subset of subcarriers and the second subset of subcarriers based on the boosting factor. The operations of 1520 may be performed according to the methods described herein. In some examples, aspects of the operations of 1520 may be performed by a scale component as described with reference to FIGS. 6 through 9.

At 1525, the receiving device may decode the first subset of subcarriers to a first set of data bits and the second subset of subcarriers to a second set of data bits. The operations of 1525 may be performed according to the methods described herein. In some examples, aspects of the operations of 1525 may be performed by a decoder component as described with reference to FIGS. 6 through 9.

Figure 16:
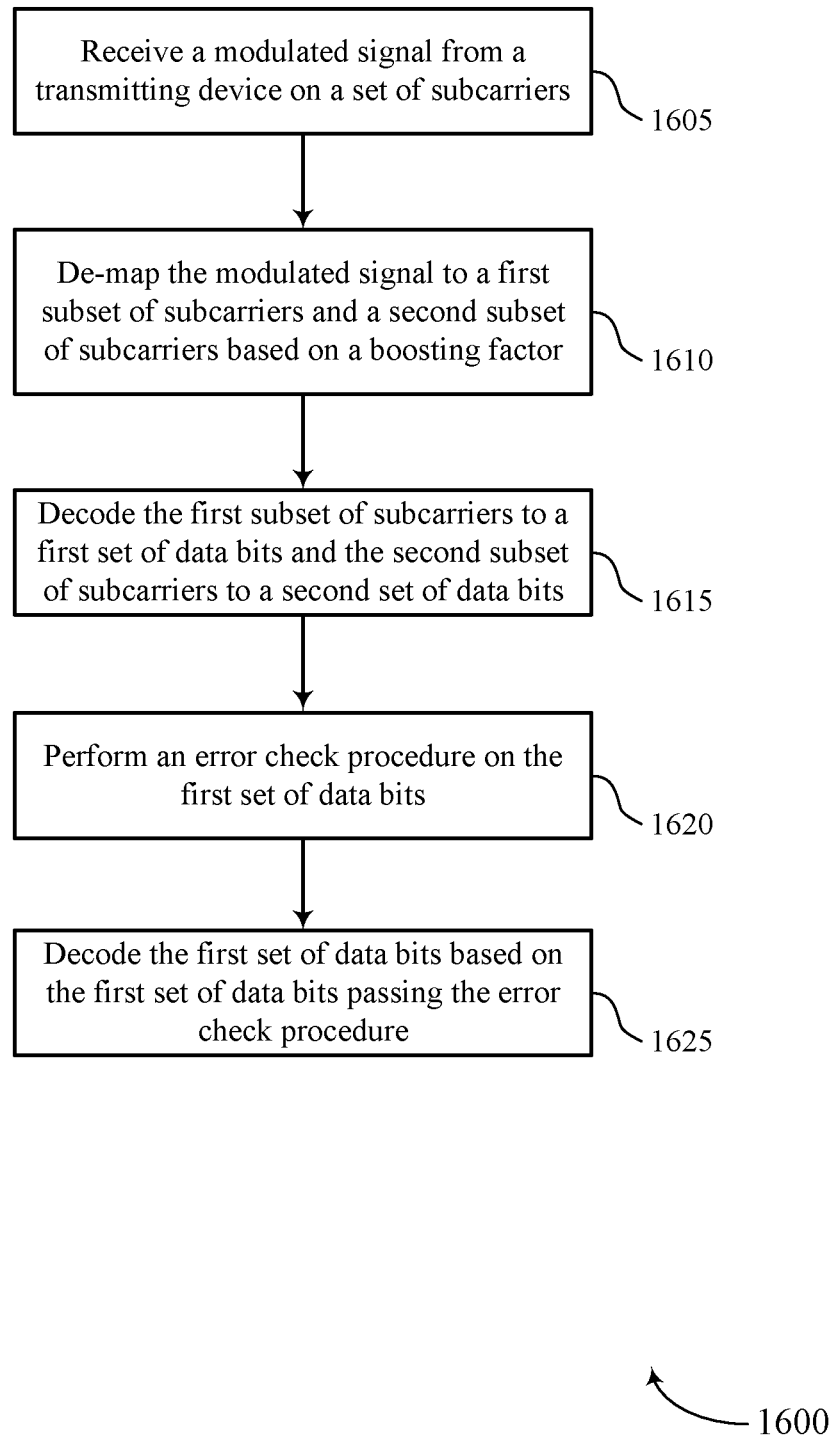

FIG. 16 shows a flowchart illustrating a method 1600 that supports boosted noncoherent modulation in accordance with aspects of the present disclosure. The operations of method 1600 may be implemented by a receiving device (e.g., a base station 105, a UE 115) or its components as described herein. For example, the operations of method 1600 may be performed by a communications manager as described with reference to FIGS. 6 through 9. In some examples, a receiving device (e.g., a base station 105, a UE 115) may execute a set of instructions to control the functional elements of the device to perform the functions described below. Additionally or alternatively, a receiving device (e.g., a base station 105, a UE 115) may perform aspects of the functions described below using special-purpose hardware.

At 1605, a receiving device may receive a modulated signal from a transmitting device on a set of subcarriers. The operations of 1605 may be performed according to the methods described herein. In some examples, aspects of the operations of 1605 may be performed by a signal component as described with reference to FIGS. 6 through 9.

At 1610, the receiving device may de-map the modulated signal to a first subset of subcarriers and a second subset of subcarriers based on a boosting factor. The operations of 1610 may be performed according to the methods described herein. In some examples, aspects of the operations of 1610 may be performed by a de-mapper component as described with reference to FIGS. 6 through 9.

At 1615, the receiving device may decode the first subset of subcarriers to a first set of data bits and the second subset of subcarriers to a second set of data bits. The operations of 1615 may be performed according to the methods described herein. In some examples, aspects of the operations of 1615 may be performed by a decoder component as described with reference to FIGS. 6 through 9.

At 1620, the receiving device may perform an error check procedure on the first set of data bits. The operations of 1620 may be performed according to the methods described herein. In some examples, aspects of the operations of 1620 may be performed by an error component as described with reference to FIGS. 6 through 9.

At 1625, the receiving device may decode the first set of data bits based on the first set of data bits passing the error check procedure. The operations of 1625 may be performed according to the methods described herein. In some examples, aspects of the operations of 1625 may be performed by an error component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a transmitting device, comprising: encoding a set of data bits to transmit to a receiving device on a set of subcarriers based at least in part on a boosting factor; mapping the set of encoded data bits to a resource block comprising a first subset of subcarriers corresponding to the set of encoded data bits and a second subset of subcarriers corresponding to a set of null bits; generating a signal comprising the set of encoded data bits based at least in part on the mapping; and transmitting the generated signal to the receiving device.

Aspect 2: The method of aspect 1, further comprising: identifying a first symbol period in the resource block adjacent to a second symbol period in the resource block based at least in part on the mapping; and allocating the first subset of subcarriers to the first symbol period and the second subset of subcarriers to the second symbol period, wherein mapping the set of encoded data bits to the resource block is based at least in part on the allocating.

Aspect 3: The method of any of aspects 1 through 2, further comprising: identifying a first spacing for a first set of symbol periods in the resource block and a second spacing for a second set of symbol periods in the resource block, wherein the first spacing for the first set of symbol periods is equal to the second spacing for the second set of symbol periods; and allocating the first subset of subcarriers to the first set of symbol periods and the second subset of subcarriers to the second set of symbol periods, wherein mapping the set of encoded data bits to the resource block is based at least in part on the allocating.

Aspect 4: The method of aspect 3, wherein the first set of symbol periods is interleaved with the second set of symbol periods.

Aspect 5: The method of any of aspects 1 through 4, further comprising: determining a frequency shift between the first subset of subcarriers and the second subset of subcarriers based at least in part on the mapping, wherein generating the signal comprising the set of encoded data bits is based at least in part on the frequency shift between the first subset of subcarriers and the second subset of subcarriers.

Aspect 6: The method of any of aspects 1 through 5, further comprising: scaling the second subset of subcarriers based at least in part on the boosting factor and a total energy of the generated signal, wherein transmitting the generated signal to the receiving device is based at least in part on scaling the second subset of subcarriers.

Aspect 7: The method of aspect 6, further comprising: performing a noise coherence estimation for the generated signal using the second subset of subcarriers based at least in part on the scaling.

Aspect 8: The method of any of aspects 1 through 7, further comprising: rate matching the set of encoded data bits based at least in part on the boosting factor.

Aspect 9: The method of any of aspects 1 through 8, wherein the boosting factor is a square root of a repetition factor.

Aspect 10: The method of any of aspects 1 through 9, wherein the generated signal comprises a same total energy equal to a second signal generated without the boosting factor.

Aspect 11: The method of any of aspects 1 through 10, wherein a value of the boosting factor is based at least in part on an MCS value, a constellation mapping configuration, a frequency allocation parameter, a channel condition, a configuration of the transmitting device, or a configuration of the receiving device, or any combination thereof.

Aspect 12: The method of any of aspects 1 through 11, further comprising: transmitting a DCI message comprising an indication of the boosting factor.

Aspect 13: The method of any of aspects 1 through 12, further comprising: identifying the boosting factor in a lookup table, wherein encoding the set of data bits to transmit to the receiving device is based at least in part on identifying the boosting factor in the lookup table.

Aspect 14: The method of any of aspects 1 through 13, wherein the mapping comprises a non-coherent modulation mapping.

Aspect 15: The method of any of aspects 1 through 14, further comprising: transmitting an RRC connection establishment message comprising a set of parameters indicating the boosting factor per MCS.

Aspect 16: A method for wireless communication at a receiving device, comprising: receiving a modulated signal from a transmitting device on a set of subcarriers; de-mapping the modulated signal to a first subset of subcarriers and a second subset of subcarriers based at least in part on a boosting factor; and decoding the first subset of subcarriers to a first set of data bits and the second subset of subcarriers to a second set of data bits.

Aspect 17: The method of aspect 16, further comprising: identifying the boosting factor associated with the modulated signal; and scaling a decoding rate of the first subset of subcarriers and the second subset of subcarriers based at least in part on the boosting factor, wherein decoding the first subset of subcarriers and the second subset of subcarriers is based at least in part on the scaled decoding rate.

Aspect 18: The method of any of aspects 16 through 17, further comprising: demodulating the first subset of subcarriers and the second subset of subcarriers based at least in part on the boosting factor.

Aspect 19: The method of any of aspects 16 through 18, further comprising: performing an error check procedure on the first set of data bits; and decoding the first set of data bits based at least in part on the first set of data bits passing the error check procedure.

Aspect 20: The method of aspect 19, wherein the error check procedure comprises a cyclic redundancy check procedure.

Aspect 21: The method of any of aspects 16 through 20, further comprising: determining that the second subset of subcarriers comprises a set of silent subcarriers; and assigning the set of silent subcarriers for noise coherence estimation.

Aspect 22: The method of any of aspects 16 through 21, wherein a total energy of the modulated signal is based at least in part on the boosting factor.

Aspect 23: The method of any of aspects 16 through 22, further comprising: receiving a DCI message comprising an indication of the boosting factor, wherein de-mapping the modulated signal to the first subset of subcarriers and the second subset of subcarriers is based at least in part on receiving the DCI message comprising the indication of the boosting factor.

Aspect 24: The method of any of aspects 16 through 23, further comprising: identifying the boosting factor in a lookup table, wherein de-mapping the modulated signal to the first subset of subcarriers and the second subset of subcarriers is based at least in part on identifying the boosting factor in the lookup table.

Aspect 25: The method of any of aspects 16 through 24, further comprising: receiving an RRC connection establishment message comprising a set of parameters indicating the boosting factor per MCS.

Aspect 26: An apparatus for wireless communications, comprising a processor; memory coupled with the processor; and instructions stored in the memory and executable by the processor to cause the apparatus to perform a method of any of aspects 1 through 14.

Aspect 27: An apparatus for wireless communications, comprising at least one means for performing a method of any of aspects 1 through 14.

Aspect 28: A non-transitory computer-readable medium storing code for wireless communications at a transmitting device, the code comprising instructions executable by a processor to perform a method of any of aspects 1 through 14.

Aspect 29: An apparatus for wireless communications, comprising a processor; memory coupled with the processor; and instructions stored in the memory and executable by the processor to cause the apparatus to perform a method of any of aspects 16 through 24.

Aspect 30: An apparatus for wireless communications, comprising at least one means for performing a method of any of aspects 16 through 24.

Aspect 31: A non-transitory computer-readable medium storing code for wireless communications at a receiving device, the code comprising instructions executable by a processor to perform a method of any of aspects 16 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
    encoding a set of data bits to transmit to a receiving device on a set of subcarriers using a boosting factor applied to the set of subcarriers, wherein the boosting factor is based at least in part on a repetition factor associated with the set of subcarriers;
    rate matching the set of encoded data bits based at least in part on the boosting factor;
    mapping the set of encoded data bits to a resource block comprising a first subset of subcarriers corresponding to the set of encoded data bits and a second subset of subcarriers corresponding to a set of null bits;
    generating a signal comprising the set of encoded data bits based at least in part on the mapping; and
    transmitting the generated signal to the receiving device.

2. The method of claim 1, further comprising:
    identifying a first symbol period in the resource block adjacent to a second symbol period in the resource block based at least in part on the mapping; and
    allocating the first subset of subcarriers to the first symbol period and the second subset of subcarriers to the second symbol period, wherein mapping the set of encoded data bits to the resource block is based at least in part on the allocating.

3. The method of claim 1, further comprising:
    identifying a first spacing for a first set of symbol periods in the resource block and a second spacing for a second set of symbol periods in the resource block, wherein the first spacing for the first set of symbol periods is equal to the second spacing for the second set of symbol periods; and
    allocating the first subset of subcarriers to the first set of symbol periods and the second subset of subcarriers to the second set of symbol periods, wherein mapping the set of encoded data bits to the resource block is based at least in part on the allocating.

4. The method of claim 3, wherein the first set of symbol periods is interleaved with the second set of symbol periods.

5. The method of claim 1, further comprising:
    determining a frequency shift between the first subset of subcarriers and the second subset of subcarriers based at least in part on the mapping, wherein generating the signal comprising the set of encoded data bits is based at least in part on the frequency shift between the first subset of subcarriers and the second subset of subcarriers.

6. The method of claim 1, further comprising:
    scaling the second subset of subcarriers based at least in part on the boosting factor and a total energy of the generated signal, wherein transmitting the generated signal to the receiving device is based at least in part on scaling the second subset of subcarriers.

7. The method of claim 6, further comprising:
    performing a noise coherence estimation for the generated signal using the second subset of subcarriers based at least in part on the scaling.

8. The method of claim 1, wherein the boosting factor is a square root of the repetition factor.

9. The method of claim 1, wherein the generated signal comprises a same total energy equal to a second signal generated without the boosting factor.

10. The method of claim 1, wherein a value of the boosting factor is based at least in part on a modulation and coding scheme value, a constellation mapping configuration, a frequency allocation parameter, a channel condition, a configuration of the transmitting device, or a configuration of the receiving device, or any combination thereof.

11. The method of claim 1, further comprising:
    transmitting a downlink control information message comprising an indication of the boosting factor.

12. The method of claim 1, further comprising:
    identifying the boosting factor in a lookup table, wherein encoding the set of data bits to transmit to the receiving device is based at least in part on identifying the boosting factor in the lookup table.

13. The method of claim 1, wherein the mapping comprises a non-coherent modulation mapping.

14. The method of claim 1, further comprising:
    transmitting a radio resource control connection establishment message comprising a set of parameters indicating the boosting factor per modulation and coding scheme.

15. A method for wireless communications at a receiving device, comprising:
    receiving a modulated signal from a transmitting device on a set of subcarriers;
    de-mapping the modulated signal to a first subset of subcarriers and a second subset of subcarriers using a boosting factor applied to the set of subcarriers, wherein the boosting factor is based at least in part on a repetition factor associated with the set of subcarriers; and
    decoding the first subset of subcarriers to a first set of data bits and the second subset of subcarriers to a second set of data bits, wherein at least one or both of the first set of data bits and the second set of data bits have been rate matched based at least in part on the boosting factor.

16. The method of claim 15, further comprising:
identifying the boosting factor associated with the modulated signal; and
scaling a decoding rate of the first subset of subcarriers and the second subset of subcarriers based at least in part on the boosting factor, wherein decoding the first subset of subcarriers and the second subset of subcarriers is based at least in part on the scaled decoding rate.

17. The method of claim 15, further comprising:
demodulating the first subset of subcarriers and the second subset of subcarriers based at least in part on the boosting factor.

18. The method of claim 15, further comprising:
performing an error check procedure on the first set of data bits; and
decoding the first set of data bits based at least in part on the first set of data bits passing the error check procedure.

19. The method of claim 18, wherein the error check procedure comprises a cyclic redundancy check procedure.

20. The method of claim 15, further comprising:
determining that the second subset of subcarriers comprises a set of silent subcarriers; and
assigning the set of silent subcarriers for noise coherence estimation.

21. The method of claim 15, wherein a total energy of the modulated signal is based at least in part on the boosting factor.

22. The method of claim 15, further comprising:
receiving a downlink control information message comprising an indication of the boosting factor, wherein de-mapping the modulated signal to the first subset of subcarriers and the second subset of subcarriers is based at least in part on receiving the downlink control information message comprising the indication of the boosting factor.

23. The method of claim 15, further comprising:
identifying the boosting factor in a lookup table, wherein de-mapping the modulated signal to the first subset of subcarriers and the second subset of subcarriers is based at least in part on identifying the boosting factor in the lookup table.

24. The method of claim 15, further comprising:
receiving a radio resource control connection establishment message comprising a set of parameters indicating the boosting factor per modulation and coding scheme.

25. An apparatus for wireless communications, comprising:
a processor, and
a memory coupled with the processor, wherein the memory comprises instructions executable by the processor to cause the apparatus to:
encode a set of data bits to transmit to a receiving device on a set of subcarriers using a boosting factor applied to the set of subcarriers, wherein the boosting factor is based at least in part on a repetition factor associated with the set of subcarriers;
rate matching the set of encoded data bits based at least in part on the boosting factor;
map the set of encoded data bits to a resource block comprising a first subset of subcarriers corresponding to the set of encoded data bits and a second subset of subcarriers corresponding to a set of null bits;
generate a signal comprising the set of encoded data bits based at least in part on the mapping; and
transmit the generated signal to the receiving device.

26. The apparatus of claim 25, wherein the instructions are further executable by the processor to cause the apparatus to:
identify a first symbol period in the resource block adjacent to a second symbol period in the resource block based at least in part on the mapping; and
allocate the first subset of subcarriers to the first symbol period and the second subset of subcarriers to the second symbol period, wherein the instructions to map the set of encoded data bits to the resource block are further executable by the processor based at least in part on the allocating.

27. The apparatus of claim 25, wherein the instructions are further executable by the processor to cause the apparatus to:
identify a first spacing for a first set of symbol periods in the resource block and a second spacing for a second set of symbol periods in the resource block, wherein the first spacing for the first set of symbol periods is equal to the second spacing for the second set of symbol periods; and
allocate the first subset of subcarriers to the first set of symbol periods and the second subset of subcarriers to the second set of symbol periods, wherein the instructions to map the set of encoded data bits to the resource block are further executable by the processor based at least in part on the allocating.

28. An apparatus for wireless communications, comprising:
a processor, and
a memory coupled with the processor, wherein the memory comprises instructions executable by the processor to cause the apparatus to:
receive a modulated signal from a transmitting device on a set of subcarriers applied to the set of subcarriers;
de-map the modulated signal to a first subset of subcarriers and a second subset of subcarriers using a boosting factor applied to the set of subcarriers, wherein the boosting factor is based at least in part on a repetition factor associated with the set of subcarriers; and
decode the first subset of subcarriers to a first set of data bits and the second subset of subcarriers to a second set of data bits, wherein at least one or both of the first set of data bits and the second set of data bits have been rate matched based at least in part on the boosting factor.

29. The apparatus of claim 28, wherein the instructions are further executable by the processor to cause the apparatus to:
identify the boosting factor associated with the modulated signal; and
scale a decoding rate of the first subset of subcarriers and the second subset of subcarriers based at least in part on the boosting factor, wherein the instructions to decode the first subset of subcarriers and the second subset of subcarriers are further executable by the processor based at least in part on the scaled decoding rate.

* * * * *